United States Patent
Lucco et al.

(10) Patent No.: US 9,342,274 B2
(45) Date of Patent: May 17, 2016

(54) DYNAMIC CODE GENERATION AND MEMORY MANAGEMENT FOR COMPONENT OBJECT MODEL DATA CONSTRUCTS

(75) Inventors: Steven Lucco, Bellevue, WA (US); Louis Lafreniere, Seattle, WA (US); Yong Qu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 638 days.

(21) Appl. No.: 13/111,927

(22) Filed: May 19, 2011

(65) Prior Publication Data
US 2012/0297360 A1  Nov. 22, 2012

(51) Int. Cl.
*G06F 9/44* (2006.01)
*G06F 9/50* (2006.01)

(52) U.S. Cl.
CPC ............... *G06F 8/30* (2013.01); *G06F 9/5022* (2013.01); *G06F 9/443* (2013.01)

(58) Field of Classification Search
CPC .......... G06F 8/30; G06F 9/443; G06F 9/5022
USPC ........................................................ 717/103
See application file for complete search history.

(56) References Cited

U.S. PATENT DOCUMENTS

| | | | |
|---|---|---|---|
| 5,471,619 A | 11/1995 | Messina | |
| 5,805,884 A | 9/1998 | Sitbon et al. | |
| 6,185,567 B1 | 2/2001 | Ratnaraj et al. | |
| 6,272,485 B1 | 8/2001 | Sragner | |
| 6,275,868 B1 | 8/2001 | Fraley et al. | |
| 6,327,608 B1 | 12/2001 | Dillingham | |
| 6,421,729 B1 | 7/2002 | Paltenghe et al. | |
| 6,463,534 B1 | 10/2002 | Geiger et al. | |

(Continued)

FOREIGN PATENT DOCUMENTS

| | | |
|---|---|---|
| JP | 11316677 | 11/1999 |
| JP | 2004054330 | 2/2004 |

(Continued)

OTHER PUBLICATIONS

Dowd, "Attacking Inteoperability", Jul. 29, 2009, pp. 1-84.*

(Continued)

*Primary Examiner* — Duy Khuong Nguyen
(74) *Attorney, Agent, or Firm* — Kevin Sullivan; Kate Drakos; Micky Minhas

(57) ABSTRACT

Dynamic code generation and memory management techniques are provided for component object model (COM) objects with corresponding representations in script code and native code. A browser component can receive script code including the code representing the COM object and a marshaling component is provided that marshals, based on a request for native code representing the COM object, the code representing the COM object to the native code based on a pre-constructed intermediate data structure. The pre-constructed intermediate data structure, such as a virtual table, is pre-constructed based on a dynamic type representation associated with a prototype of the COM object and cached for re-use by the marshaling component. Other embodiments provide finalizer support for memory management of COM objects having script and native world representations including an implementation of a two-phase commit protocol that enables efficient and conservative recycling of objects and associated memory.

17 Claims, 12 Drawing Sheets

(56) References Cited

U.S. PATENT DOCUMENTS

| | | | |
|---|---|---|---|
| 6,510,504 B2 | 1/2003 | Satyanarayanan | |
| 6,546,397 B1 | 4/2003 | Rempell | |
| 6,567,918 B1 | 5/2003 | Flynn et al. | |
| 6,601,233 B1 | 7/2003 | Underwood | |
| 6,629,123 B1 | 9/2003 | Hunt | |
| 6,686,932 B2 | 2/2004 | Rath et al. | |
| 6,717,593 B1 | 4/2004 | Jennings | |
| 6,732,109 B2 | 5/2004 | Lindberg et al. | |
| 6,748,418 B1 | 6/2004 | Yoshida et al. | |
| 6,792,459 B2 | 9/2004 | Elnozahy et al. | |
| 6,842,906 B1 | 1/2005 | Bowman-Amuah | |
| 6,874,084 B1 | 3/2005 | Dobner et al. | |
| 6,904,453 B2 | 6/2005 | Shuster et al. | |
| 6,934,757 B1 | 8/2005 | Kalantar et al. | |
| 6,950,983 B1 | 9/2005 | Snavely | |
| 6,957,439 B1 | 10/2005 | Lewallen | |
| 6,959,393 B2 | 10/2005 | Hollis | |
| 6,961,929 B1 | 11/2005 | Pelegri-Llopart et al. | |
| 6,985,953 B1 | 1/2006 | Sandhu et al. | |
| 6,990,653 B1 * | 1/2006 | Burd et al. | 717/108 |
| 6,993,596 B2 | 1/2006 | Hinton | |
| 7,000,107 B2 | 2/2006 | Hewett et al. | |
| 7,076,786 B2 | 7/2006 | Burd et al. | |
| 7,143,195 B2 | 11/2006 | Vange | |
| 7,143,347 B2 | 11/2006 | Su | |
| 7,219,329 B2 | 5/2007 | Meijer | |
| 7,225,225 B2 | 5/2007 | Kuki et al. | |
| 7,269,833 B2 | 9/2007 | Kushnirskiy | |
| 7,293,034 B2 | 11/2007 | Paya et al. | |
| 7,334,235 B2 | 2/2008 | Hunt et al. | |
| 7,340,604 B2 | 3/2008 | Hewett et al. | |
| 7,359,976 B2 | 4/2008 | Ross et al. | |
| 7,437,558 B2 | 10/2008 | Fenton et al. | |
| 7,458,096 B2 | 11/2008 | Knouse et al. | |
| 7,467,399 B2 | 12/2008 | Nadalin et al. | |
| 7,469,302 B2 | 12/2008 | Whittle et al. | |
| 7,487,262 B2 | 2/2009 | Cardina et al. | |
| 7,584,232 B2 | 9/2009 | Guo | |
| 7,730,465 B2 | 6/2010 | Sutter | |
| 7,735,094 B2 | 6/2010 | Varshney | |
| 7,802,238 B2 | 9/2010 | Clinton | |
| 7,809,785 B2 | 10/2010 | Appleton et al. | |
| 7,870,112 B2 | 1/2011 | Karun et al. | |
| 7,912,924 B1 | 3/2011 | Cantrell | |
| 8,245,049 B2 | 8/2012 | Ramani | |
| 8,335,982 B1 | 12/2012 | Colton et al. | |
| 8,601,278 B2 | 12/2013 | Ramini et al. | |
| 8,646,029 B2 | 2/2014 | Leithead et al. | |
| 8,689,182 B2 | 4/2014 | Leithead et al. | |
| 8,881,101 B2 | 11/2014 | Leithead et al. | |
| 8,904,474 B2 | 12/2014 | Leithead et al. | |
| 8,918,759 B2 | 12/2014 | Leithead et al. | |
| 9,116,867 B2 | 8/2015 | Leithead et al. | |
| 2001/0051885 A1 | 12/2001 | Nardulli et al. | |
| 2002/0007317 A1 | 1/2002 | Callaghan et al. | |
| 2002/0116407 A1 | 8/2002 | Negishi et al. | |
| 2002/0124172 A1 | 9/2002 | Manahan | |
| 2002/0161835 A1 | 10/2002 | Ball et al. | |
| 2002/0184491 A1 | 12/2002 | Morgan et al. | |
| 2003/0023873 A1 | 1/2003 | Ben-Itzhak | |
| 2003/0028762 A1 | 2/2003 | Trilli et al. | |
| 2003/0093666 A1 | 5/2003 | Millen et al. | |
| 2003/0159063 A1 | 8/2003 | Apfelbaum et al. | |
| 2003/0177285 A1 | 9/2003 | Hunt et al. | |
| 2004/0015580 A1 | 1/2004 | Lu et al. | |
| 2004/0103200 A1 | 5/2004 | Ross et al. | |
| 2004/0128546 A1 | 7/2004 | Blakley, III et al. | |
| 2004/0139314 A1 | 7/2004 | Cook et al. | |
| 2004/0205650 A1 | 10/2004 | Cheng | |
| 2004/0210536 A1 | 10/2004 | Gudelj et al. | |
| 2004/0260754 A1 | 12/2004 | Olson et al. | |
| 2005/0028140 A1 | 2/2005 | Ayachitula et al. | |
| 2005/0044197 A1 | 2/2005 | Lai | |
| 2005/0050547 A1 | 3/2005 | Whittle et al. | |
| 2005/0060427 A1 | 3/2005 | Phillips et al. | |
| 2005/0108353 A1 | 5/2005 | Yamamoto | |
| 2005/0174974 A1 | 8/2005 | Sonntag et al. | |
| 2005/0177566 A1 * | 8/2005 | Craig et al. | 707/4 |
| 2005/0187895 A1 | 8/2005 | Paya | |
| 2005/0223412 A1 | 10/2005 | Nadalin et al. | |
| 2005/0251742 A1 | 11/2005 | Mogilevsky et al. | |
| 2005/0259656 A1 | 11/2005 | Dollar et al. | |
| 2005/0268100 A1 | 12/2005 | Gasparini et al. | |
| 2005/0278792 A1 | 12/2005 | Ramani et al. | |
| 2006/0010134 A1 | 1/2006 | Davis | |
| 2006/0026379 A1 | 2/2006 | Jung | |
| 2006/0053276 A1 | 3/2006 | Lortz et al. | |
| 2006/0053293 A1 | 3/2006 | Zager et al. | |
| 2006/0087983 A1 | 4/2006 | Vigoureux et al. | |
| 2006/0143688 A1 | 6/2006 | Futoransky et al. | |
| 2006/0179350 A1 * | 8/2006 | Nathan | G06F 11/3688 714/38.1 |
| 2006/0218403 A1 | 9/2006 | Sauve et al. | |
| 2006/0221941 A1 | 10/2006 | Kishinsky et al. | |
| 2007/0006148 A1 | 1/2007 | Varshney | |
| 2007/0050854 A1 | 3/2007 | Cooperstein et al. | |
| 2007/0055964 A1 * | 3/2007 | Mirkazemi | G06F 8/41 717/140 |
| 2007/0074169 A1 | 3/2007 | Chess et al. | |
| 2007/0107057 A1 | 5/2007 | Chander et al. | |
| 2007/0113282 A1 | 5/2007 | Ross | |
| 2007/0136809 A1 | 6/2007 | Kim et al. | |
| 2007/0150603 A1 | 6/2007 | Crull | |
| 2007/0162394 A1 | 7/2007 | Zager et al. | |
| 2007/0192494 A1 | 8/2007 | Yamakawa et al. | |
| 2007/0234060 A1 | 10/2007 | Tsubono | |
| 2007/0256003 A1 | 11/2007 | Wagoner et al. | |
| 2007/0282951 A1 | 12/2007 | Selimis | |
| 2007/0288247 A1 | 12/2007 | Mackay | |
| 2008/0034425 A1 | 2/2008 | Overcash et al. | |
| 2008/0059634 A1 | 3/2008 | Commons | |
| 2008/0133540 A1 | 6/2008 | Hubbard et al. | |
| 2008/0235675 A1 * | 9/2008 | Chen | 717/147 |
| 2008/0263086 A1 | 10/2008 | Klemba et al. | |
| 2008/0298342 A1 | 12/2008 | Appleton et al. | |
| 2008/0313648 A1 | 12/2008 | Wang et al. | |
| 2009/0037806 A1 | 2/2009 | Yang et al. | |
| 2009/0048915 A1 | 2/2009 | Chan | |
| 2009/0070663 A1 | 3/2009 | Fan et al. | |
| 2009/0070869 A1 | 3/2009 | Fan et al. | |
| 2009/0119769 A1 | 5/2009 | Ross et al. | |
| 2009/0125595 A1 | 5/2009 | Maes | |
| 2009/0132713 A1 | 5/2009 | Dutta et al. | |
| 2009/0161132 A1 | 6/2009 | Sato | |
| 2009/0183227 A1 | 7/2009 | Isaacs et al. | |
| 2009/0217311 A1 | 8/2009 | Kocyan et al. | |
| 2009/0328064 A1 * | 12/2009 | Quinn, Jr. | G06F 9/547 719/315 |
| 2010/0017461 A1 | 1/2010 | Kokkevis et al. | |
| 2010/0023884 A1 | 1/2010 | Brichford et al. | |
| 2010/0100823 A1 | 4/2010 | Ewe et al. | |
| 2010/0125895 A1 | 5/2010 | Shull et al. | |
| 2010/0262780 A1 | 10/2010 | Mahan et al. | |
| 2010/0281537 A1 | 11/2010 | Wang et al. | |
| 2010/0306642 A1 | 12/2010 | Lowet et al. | |
| 2011/0015917 A1 | 1/2011 | Wang et al. | |
| 2012/0304044 A1 | 11/2012 | Leithead | |
| 2012/0304150 A1 | 11/2012 | Leithead | |
| 2012/0304203 A1 | 11/2012 | Leithead et al. | |
| 2012/0304303 A1 | 11/2012 | Leithead et al. | |
| 2012/0304316 A1 | 11/2012 | Ramani et al. | |
| 2013/0042255 A1 | 2/2013 | Leithead et al. | |
| 2013/0047064 A1 | 2/2013 | Leithead | |
| 2013/0047258 A1 | 2/2013 | Leithead et al. | |
| 2014/0365862 A1 | 12/2014 | Qu et al. | |
| 2015/0026661 A1 | 1/2015 | Leithead et al. | |
| 2015/0058714 A1 | 2/2015 | Leithead et al. | |
| 2015/0058924 A1 | 2/2015 | Leithead et al. | |

FOREIGN PATENT DOCUMENTS

| | | |
|---|---|---|
| JP | 2004164617 | 6/2004 |
| JP | 2005092564 | 8/2005 |
| JP | 2006099460 | 4/2006 |

(56) References Cited

FOREIGN PATENT DOCUMENTS

| | | |
|---|---|---|
| JP | 2007047884 | 2/2007 |
| JP | 2007159013 | 6/2007 |
| JP | 2007183838 | 7/2007 |
| JP | 2007241809 | 9/2007 |
| JP | 2007241906 | 9/2007 |
| WO | 2005062707 | 7/2005 |
| WO | 2005091107 | 9/2005 |

OTHER PUBLICATIONS

Langer, "Bringing COM Technology to Alignment Software", Nov. 2002, p. 1-16.*
Engelen, "The gSOAP Toolkit for Web Services and Peer-To-Peer Computing Networks", May 21, 2002, pp. 1-8.*
An Architectural View of Distributed Objects and Components; 1998.
Tierney, Luke, Connecting Lisp-Stat to COM, Jan. 10, 2000.
Reference counting, Aug. 10, 2010.
Info: Develop Microsoft Office solutions with Visual Studio .NET; May 9, 2007.
Microsoft .NET/COM Migration and Interoperability, Aug. 2001.
Examiner's Answer to Appeal Brief, U.S. Appl. No. 13/658,668, Aug. 1, 2014, 49 pages.
Final Office Action, U.S. Appl. No. 13/656,156, Sep. 17, 2013, 15 pages.
Final Office Action, U.S. Appl. No. 13/658,668, Jun. 18, 2013, 26 pages.
Non-Final Office Action, U.S. Appl. No. 13/656,245, Aug. 2, 2013, 16 pages.
Non-Final Office Action, U.S. Appl. No. 14/507,568, May 28, 2015, 14 pages.
Notice of Allowance, U.S. Appl. No. 13/149,582, Sep. 18, 2013, 15 page.
Notice of Allowance, U.S. Appl. No. 13/656,156, Jul. 18, 2014, 7 pages.
Notice of Allowance, U.S. Appl. No. 13/656,245, Oct. 28, 2013, 14 pages.
Second Written Opinion, Application No. PCT/US2014/040582, Apr. 17, 2015, 8 Pages.
Notice of Allowance, U.S. Appl. No. 14/532,826, Apr. 15, 2015, 8 pages.
International Search Report and Written Opinion, Application No. PCT/US2014/040582, Nov. 3, 2014, 15 pages.
Supplemental Notice of Allowance, U.S. Appl. No. 13/114,924, Oct. 2, 2014, 5 pages.
Wagner, et al.,' "Compartmental Memory Management in a Modern Web Browser", Proceedings of the International Symposium on Memory Management, ISMM '11, Jun. 4, 2011, 10 pages.
Examiner's Answer to Appeal Brief, U.S. Appl. No. 13/149,645, Jul. 28, 2014, 48 pages.
Notice of Allowance, U.S. Appl. No. 13/114,924, Jun. 25, 2014, 12 pages.
Notice of Allowance, U.S. Appl. No. 13/150,877, Jul. 22, 2014, 12 pages.
Final Office Action, U.S. Appl. No. 13/150,877, Jan. 13, 2014, 18 pages.
Final Office Action, U.S. Appl. No. 13/114,924, Jan. 27, 2014, 21 pages.
"Advanced Server-Side Authentication for Data Connections in InfoPath 2007 Web Based Forms", http://msdn2.microsoft.com/en-us/library/bb 787184.aspx#ip2007 AdvancedServerSideAuthentication OverviewofServerSideAuthenticationScenarios, (Sep. 2007), 10 pages.
"Coding Basics—JavaScript Native Interface (JSNI)", Retrieved from: <http://code.google.com/webtoolkiUdoc/1.6/ DevGuideCodingBasics. html#DevGuideJavaScriptNativeInterface> on Jan. 28, 2011, 26 pages.
Final Office Action, U.S. Appl. No. 11/935,323 (Jul. 18, 2011), 15 pages.
Final Office Action, U.S. Appl. No. 11/942,734 (Jan. 21, 2010), 36 pages.
Final Office Action, U.S. Appl. No. 11/942,734, (Apr. 5, 2011), 45 pages.
Final Office Action, U.S. Appl. No. 11/942,734 (Sep. 13, 2010), 38 pages.
Final Office Action, U.S. Appl. No. 13/149,645, (Jun. 20, 2013), 25 pages.
"Flash Cross Domain XML", httQ://www.w3.org/TR/2007/WD-access-control-20071001, (Nov. 3, 2007), 1-1.
"Microsoft Security Program: Microsoft Security Bulletin—MS98-020—Patch Available for Frame Spoof Vulnerability", Retrieved from: <http://www.microsoft.com/technet/security/bulietin/ms98-020.msQx> on Jul. 1, 2011, (Dec. 23, 1998), 2 pages.
"Microsoft Windows Internet Explorer and Other Trident Based Browsers", Retrieved from: <http://www.legendscrolls.co.uk/webstandards/ie> on May 25, 2011, (May 20, 2011), 8 pages.
"Microsoft Windows Script Interfaces", Retrieved from: <http://msdn.microsoft.com/en-us/library/t9d4xf28(v=vs.85).aspx> on Jan. 28, 2011, (Aug. 2009), 3 pages.
"Microsoft.NET/COM Migration and Interoperability", Microsoft Patterns & Practices; Proven Practices for Predictable Results available through http://www.msdn.microsoft.com/practices/default.aspx (2010), 15 pages.
Netscape Security News Archive, Available at <http://netscape.1command.com/relnotes/>, (1997), 14 pages.
Non Final Office Action, U.S. Appl. No. 11/935,323, (Nov. 5, 2010), 11 pages.
Non-Final Office Action, U.S. Appl. No. 10/867,338 (Apr. 21, 2010), 15 pages.
Non-Final Office Action, U.S. Appl. No. 10/867,338, (Jul. 14, 2010), 15 pages.
Non-Final Office Action, U.S. Appl. No. 11/150,869 (Sep. 3, 2009), 9 pages.
Non-Final Office Action, U.S. Appl. No. 11/942,734, (Aug. 7, 2009), 31 pages.
Non-Final Office Action, U.S. Appl. No. 11/942,734 (Nov. 18, 2010), 43 pages.
Non-Final Office Action, U.S. Appl. No. 11/942,734, (May 3, 2010), 32 pages.
Non-Final Office Action, U.S. Appl. No. 13/114,924 (Aug. 16, 2013), 19 pages.
Non-Final Office Action, U.S. Appl. No. 13/149,582, (Jan. 7, 2013), 12 pages.
Non-Final Office Action, U.S. Appl. No. 13/149,645 (Nov. 23, 2012), 19 pages.
Non-Final Office Action, U.S. Appl. No. 13/150,877, (Apr. 30, 2013), 29 pages.
Non-Final Office Action, U.S. Appl. No. 13/656,156 (Apr. 2, 2013), 13 pages.
Non-Final Office Action, U.S. Appl. No. 13/656,245, (Feb. 1, 2013), 26 pages.
Non-Final Office Action, U.S. Appl. No. 13/658,668 (Jan. 3, 2013),18 pages.
"NoScript", 2004-2007, Inform Action, retrieved from <http://noscript.net/features> on Aug. 23, 2007, 5 pages.
Notice of Allowance, U.S. Appl. No. 10/303,113, (Dec. 10, 2007), 11 pages.
Notice of Allowance, U.S. Appl. No. 10/867,338 (Apr. 12, 2012), 8 pages.
Notice of Allowance, U.S. Appl. No. 11/150,869, (Feb. 9, 2010), 8 pages.
"Protecting Commercial Secure Web Servers from Key-Finding Threats", nCipher, Inc., Available at <www.ncipher.com/uploads/resources/pcws.pdf>,(1999), 12 pages.
"Randomization of HTML Tags and Embedded Scripts in Web Pages", Microsoft Research, 2139156v2, retrieved on Nov. 15, 2007, 14 pages.
Requirement for Information, U.S. Appl. No. 10/867,338 (Oct. 26, 2010), 7 pages.

(56) References Cited

OTHER PUBLICATIONS

Restriction Requirement, U.S. Appl. No. 11/150,869, (May 20, 2009), 6 pages.
Restriction Requirement, Application No. 131114 924 (May 7, 2013), 6 pages.
Restriction Requirement, U.S. Appl. No. 13/149,582, (Aug. 6, 2012), 5 pages.
Restriction Requirement, U.S. Appl. No. 13/150,877 (Feb. 25, 2013), 6 pages.
Restriction Requirement, U.S. Appl. No. 13/656,156, (Feb. 21, 2013), 6 pages.
"Tagneto", http://tagneto.blogspot.com/2006/10/ie-7-and-iframe-apis-part-2.html, (Nov. 3, 2007), pp. 1-5.
"Update Available for "Frame Spoof" Security Issue", Retrieved from: <http://support.microsoft.com/default.aspx?scid=kd;en-us;167614&sd=tech> on Apr. 21, 2011, (Aug. 23, 2007), 3 pages.
"What's New in Internet Explorer 8", Retrieved from: <http://msdn.microsoft.com/enus/librarv/cc288472(v=vs.85).aspx> on Jan. 28, 2011 (2009), 15 pages.
Amato, Gianni "Protect Your Browser Mozilla Firefox from XSS Attacks", XSS Warning: Security extension for Mozilla Firefox, retrieved from <http://www.gianniamato.iUproject/extension/xsswarning/> on Nov. 5, 2007,(2007),1 page.
Anupam, et al., "Secure Web Scripting", 1998 IEEE, (1998), pp. 46-55.
Barth, Adam "Securing Frame Communication in Browsers", Communications of the ACM, vol. 52, No. 6, (Jun. 2009), pp. 83-91.
Chan, Bernice et al., "A Client-Side Browser-Integrated Solution for Detecting and Preventing Cross Site Scripting (XSS) Attacks", available at <http://www.eecg.toronto.eduHie/Courses/ECE1776-2006/Updates/XSS update.pdf>, (Sep. 25, 2006), 3 pages.
Couvreur, Juien "Curiosity is Bliss: Web API Authentication for Mashups", Available at http://blog.monstuff.com/archives/000296.html (Jun. 25, 2006), 5 pages.
Crockford, Douglas "JSONRequest", Retrieved from: <http://json.org/JSONRequest.html> on Nov. 3, 2007 (Apr. 17, 2006), 8 pages.
De Keukelaera, Frederik et al., "SMash: Secure Component Model for Cross-Domain Mashups on Unmodified Browsers", Proceeding of the 17th International Conference on World Wide Web, Apr. 21-25, 2008, ACM Press, New York, NT, USA, (Apr. 21, 2008), 13 pages.
Festa, Paul "Communicator subject to frame-spoofing", Retrieved from: <http://news.cnet.com/2100-1023-21975.html&tag=mncol%3btxt> on Oct. 11, 2010, (Jan. 5, 1999), 1 page.
Grosskurth, Alan et al., "Architecture and Evolution of the Modern Web Browser", David R. Cheriton School of Computer Science, University of Waterloo, Available at <http://grosskurth.ca/papers/browser-archevol-20060619.pdf>, (Jun. 2006), pp. 1-24.
Herzberg, Amir et al., "Protecting (even) Naive Web Users, or: Preventing Spoofing and Establishing Credentials of Web Sites", Bar Ilan University, Available at <www.cs.bu.ac.il/~herzea/papers/ecom-merce/trusted credentials area.pdf>, (Jul. 18, 2004), 26 pages.
Horak, Ales et al., "DEBVisDic—First Version of New Client-Server Wordnet Browsing and Editing Tool", In Proceedings of GWC 2006, Available at <https://www.cs.cas.czlsemweb/download.php?file=06-11-palaetal&type=pdf>, (Jan. 2006), 5 pages.
Hunt, Galen et al., "Detours: Binary Interception of Win32 Functions", Proceedings of the 3rd US EN IX Windows NT Symposium (Jul. 1999), pp. 1-9.
Jackson, Collin et al., "Subspace: Secure CrossDomain Communication for Web Mashups", In Proceedings of the International World Wide Web Conference Committee (IW3C2), May 8-12, 2007, available at <http://citeseerx.ist.psu.edu/viewdoc/download?doi=10.1.1.123.1586&rep=rep1&type=pdf>,(May 8, 2007), 10 pages.
Jim, Trevor et al., "Defeating Script Injection Attacks with Browser-Enforced Embedded Policies", In Proceedings of WWW 2007, May 8-12, 2007, available at <http://www2007.org/papers/paper595.pdf>,(May 8, 2007), pp. 601-610.
Kaminsky, Dan "Black Ops 2007: Design Reviewing The Web", IOActive Comprehensive Computer Security Services, Available at <http://www.doxpara.com/DMK B02K7 Web.ppt>,(2007), 67 pages.
Karlof, Chris et al., "Dynamic Pharming Attacks and Locked Same-origin Policies for Web Browsers", In Proceedings of CCS 2007, (Nov. 2007), pp. 58-71.
Kirda, Engin et al., "Noxes: A Client-Side Solution for Mitigating Cross-Site Scripting Attacks", Proceedings of SAC 06, Apr. 23-27, 2006, available at <http://www.seclab.tuwien.ac.aUpapers/noxes.pdf>,( Apr. 23, 2006), 8 pages.
Levin, Lori et al., "The JANUS-III Translation System: Speech-to-Speech Translation in Multiple Domains", Machine Translation, vol. 15,(2000), pp. 3-25.
Ley, Jim "Using the XML HTTP Request object", Retrieved from: <http://www.jibbering.com/2002/4/httprequest.2005.8.html> on Nov. 4, 2011, (Apr. 2002), 6 pages.
Matthies, Christian "DNS Pinning Explained", Retrieved from: <http://christ1an.blogspot.com/2007/07/dns-pinning-explained.html> on Nov. 3, 2007, (Jul. 1, 2007), 12 pages.
Melez, Myk et al., "Mozilla Application Framework in Detail", Retrieved from: <https://developer.mozilla.org/en/mozilla application framework in detail> on Jan. 28, 2011,(Feb. 15, 2006), 6 pages.
Miyamoto, Daisuke et al., "SPS: A Simple Filtering Algorithm to Thwart Phishing Attacks", AINTEC 2005, (2005), 15 pages.
Nielson, Jordan et al., "Benchmarking Modern Web Browsers", Department of Computer Science, University of Calgary, Available at <http://www.aqualab.cs.northwestern.edu/HotWeb08/papers/Nielson-BMW.pdf>,(Oct. 2008), pp. 1-6.
Nixey, Peter "Why XHR Should Become Opt-In Cross-Domain", Retrieved from; <http://www.webkitchen.co.uk/2006/07/why-xhr-should-become-opt-in-cross.html> on Dec. 21, 2007, (Jul. 25, 2006), 17 pages.
Novak, Mark "Extending SDL: Documenting and Evaluating the Security Guarantees of Your Apps", MSDN Magazine, available at <http://msdn.microsoft.com/en-us/magazine/cc163522.aspx>,(Nov. 2006), 6 pages.
Radosevic, Danijel et al., "Development of a Higher-Level Multimedia Scripting Language", 23rd Int. Conf. Information Technology Interfaces ITI 2001, (Jun. 19, 2001), pp. 201-208.
Samarati, Pierangela et al., "An Authorization Model for a Distributed Hypertext System", IEEE Transactions on Knowledge and Data Engineering, vol. 8, No. 4, (Aug. 1996), pp. 555-562.
Spanias, Andreas et al., "Development Of New Functions and Scripting Capabilities in Javaa-DSP For Easy Creation and Seamless Integration Of Animated DSP Simulations In Web Courses", 2001 IEEE, (2001), pp. 2717-2720.
Tam, et al., "A Fast and Flexible Framework Of Scripting for Web Application Development: A Preliminary Experience Report", 2000 IEEE, (2000), pp. 450-455.
Van Kesteren, Anne "Cross Domain HXR Enabling Read Access for Web Resourced", http://www.w3.org/TR/2007/WD-access-control-200710011, (Nov. 3, 2007), 1-12.
Verisign Inc., "Licensing VeriSign Certificates: Securing Multiple Web Server and Domain Configurations", White Paper, Available at <www.msctrustgate.com/pdf/licensing.pdf>, (Nov. 2, 2001), 15 pages.
Zoline, Kenneth O., "An Approach for Interconnections SNA and XNS Networks", In Proceedings of SIGCOMM 1985,(1985), pp. 184-198.
Zhuang, Xiaoyu, "Interaction Between Web Browsers and Script Engines", Retrieved at <<http://uu.diva-portal.org/smash/get/diva2:566712/FULLTEXT01>>, In Student Thesis, Master Programme in Computer Science, Uppsala University, Nov. 2012, pp. 63.
Wang, et al., "Protection and Communication Abstractions for Web Browsers in MashupOS", Retrieved at <<http://www.csd.uwo.ca/faculty/hanan/610/papers/mashups.pdf>>, In Proceedings of Twenty-first ACM SIGOPS Symposium on Operating Systems Principles, Oct. 14, 2007, pp. 15.
PCT International Search Report and Written Opinion for Application No. PCT/US2008/079989, Apr. 15, 2009, 10 pages.

(56) References Cited

OTHER PUBLICATIONS

PCT International Preliminary Report on Patentability for Application No. PCT/US2014/040582, Jul. 17, 2015, 11 pages.
U.S. Appl. No. 14/507,568, Notice of Allowance mailed Sep. 14, 2015, 8 pages.
U.S. Appl. No. 14/507,568, Amendment filed Aug. 27, 2015, 20 pages.
U.S. Appl. No. 13/114,924, Amendment filed Apr. 25, 2014, 21 pages.
U.S. Appl. No. 13/114,924, Amendment filed Nov. 15, 2013, 19 pages.
Extended European Search Report, EP Application No. 08848369.8, Oct. 14, 2013, 6 pages.
U.S. Appl. No. 10/867,338, Final Office Action dated May 13, 2008, 6 pages.
Foreign Office Action, CN Application No. 200880115316.8, Mar. 20, 2012, 13 pages.
Foreign Office Action, CN Application No. 200880115316.8, Jun. 8, 2013, 12 pages.
Foreign Office Action, CN Application No. 200880115316.8, Jun. 27, 2012, 12 pages.
Foreign Office Action, CN Application No. 200880115316.8, Sep. 27, 2012, 6 pages.
Foreign Office Action, CN Application No. 200880115316.8, Oct. 25, 2011, 11 pages.
Foreign Office Action, JP Application No. 2010-533140, Apr. 26, 2013, 11 pages.
Foreign Office Action, JP Application No. 2010-533140, Sep. 24, 2013, 4 pages.
U.S. Appl. No. 10/867,338, Office Action mailed Nov. 15, 2007, 5 pages.
U.S. Appl. No. 11/935,323, Office Action mailed Dec. 18, 2013, 16 pages.
U.S. Appl. No. 13/570,044, Office Action mailed Apr. 19, 2013, 5 pages.
U.S. Appl. No. 13/570,044, Notice of Allowance mailed Jul. 22, 2013, 6 pages.
Ernesto Damiani, "A Fine-Grained Control System for XML Documents", ACM, May 2002, pp. 169-202.
Kevin Fu, "Dos and Don'ts of Client Authentication on the Web", IEEE, 2002, 2002, 17 pages.
Joshi, "Security Models for Web-Based Applications", Communications of the ACM, Feb. 2001, 10 pages.
Komathy, "Security for XML messaging services—a component-based approach", Journal of Network and Computer Applications, 2003, 15 pages.
U.S. Appl. No. 13/911,514, Notice of Allowance dated Sep. 14, 2015, 20 pages.
U.S. Appl. No. 13/911,514, Amendment filed Aug. 19, 2015, 11 pages.
U.S. Appl. No. 13/911,514, Notice of Allowance dated May 20, 2015, 21 pages.
PCT Demand, Application No. PCT/US2014/040582, Feb. 16, 2015, 14 pages.
U.S. Appl. No. 13/114,924, Notice of Allowance mailed Dec. 30, 2015, 21 pages.

\* cited by examiner

DYNAMIC CODE GENERATION AND MEMORY MANAGEMENT FOR COMPONENT OBJECT MODEL DATA CONSTRUCTS

TECHNICAL FIELD

The subject disclosure relates to dynamic code generation and memory management for component object model (COM) data constructs with corresponding representations in script code and native code.

BACKGROUND

As the web browsing experience begins to evolve from a flat presentation of information with minimal interactivity to a richer application or applet experience with lots of interactivity at the client side, or more generally, a hybrid of information display and richer interactivity with objects on display, there are a variety of challenges based on evolving the old document object model (DOM) originally designed primarily for flat presentation of information based on native code on a client to an experience that fluidly handles script code, such as javascript objects. For instance, speeding the user experience up is a main challenge.

For instance, with fly out menus of the past, the web experience flickered with delays based on communications with the server. Script enables small programs to modify the DOM on the fly without going back to the server, e.g., Asynchronous JavaScript and extensible markup language (AJAX). As people want to do more and more on the fly without returning to the server, making script code execute fast has become a challenge.

Since the user experience centers on scripting the DOM, it is desirable to be able to change the DOM very fast since that maximizes the interactive response. Communication between the scripting engines and the native classes of the DOM were poor in the past due to the use of OLE automation including a set of interfaces, iDispatch, iActiveScript, etc., which make any object scriptable. In addition, a variety of Component Object Model (COM) objects may be indiscriminately created today, but which may be unnecessary, or otherwise introduce overhead maintaining the objects, slowing down performance.

In short, to date, there have been no web browsing systems designed specifically around efficient code generation for marshaling between script and native worlds for COM data structures, or around memory management designed for COM and COM data structures. In this regard, COM is a binary-interface standard for software components used to enable interprocess communication and dynamic object creation in a large range of programming languages.

Basically, COM is a language-neutral way of implementing objects that can be used in environments different from the one in which they were created, even across machine boundaries. For well-authored components, COM allows reuse of objects with no knowledge of their internal implementation, as it forces component implementers to provide well-defined interfaces that are separate from the implementation. The different allocation semantics of languages are accommodated by making objects responsible for their own creation and destruction through reference-counting. Casting between different interfaces of an object is achieved through the QueryInterface( ) function. The preferred method of inheritance within COM is the creation of sub-objects to which method calls are delegated.

However, as mentioned, conventional web browsing has evolved in a way that can lead to inefficient use of COM constructs, noticeably affecting performance of a web browsing experience, and modern fast broadband data connections make such delays more noticeable, allowing for greater margins of improvement in the user experience.

The above-described deficiencies of today's code generation and memory management schemes are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with dynamic code generation and memory management techniques for COM objects with corresponding representations in script code and native code.

For instance, an embodiment includes receiving, by a browser application of a computing device, script code including code representing a component object model (COM) object and generating a prototype of the COM object including a type representation with dynamic type(s) associated with the COM object. Then, in response to a request for native code representing the COM object, the code representing the COM object is marshaled to the native code based on intermediate data construct(s) tailored for dynamic COM object translation between the script code and the native code. The intermediate data construct(s) tailored for dynamic COM object translation can be dynamically generated if not pre-stored in cache memory. In one example embodiment, a virtual table is generated based on a type of the dynamic type(s) and the virtual table generated for the type is cached for re-use.

In one non-limiting implementation, a browser component receives script code including the code representing the COM object and a marshaling component can marshal, based on a request for native code representing the COM object, the code representing the COM object to the native code based on a pre-constructed intermediate data structure. The pre-constructed intermediate data structure is pre-constructed based on a dynamic type representation associated with a prototype of the COM object and cached for re-use by the marshaling component.

For an example of efficient memory management for COM objects, a method includes initiating a request to reclaim memory associated with a script code object with a dependency to a component object model (COM) object represented in native code and requesting the script code object and the COM object to prepare for the request to reclaim the memory associated with the script code object. Following a two-phase commit process, in response to receiving confirmation from the script code object that the script code object is prepared for the request and in response to receiving confirmation from the COM object that the COM object is prepared for the request, the dependency is unwound, or otherwise undone or finalized, and allowing the system to reclaim the memory associated with the script code object. As an example, the unwinding of the dependency can include releasing a reference to the COM object. Furthermore, before confirming the memory can be reclaimed, the references of the COM object can be checked to determine if an additional dependency of the COM object prevents the confirmation from the COM object.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
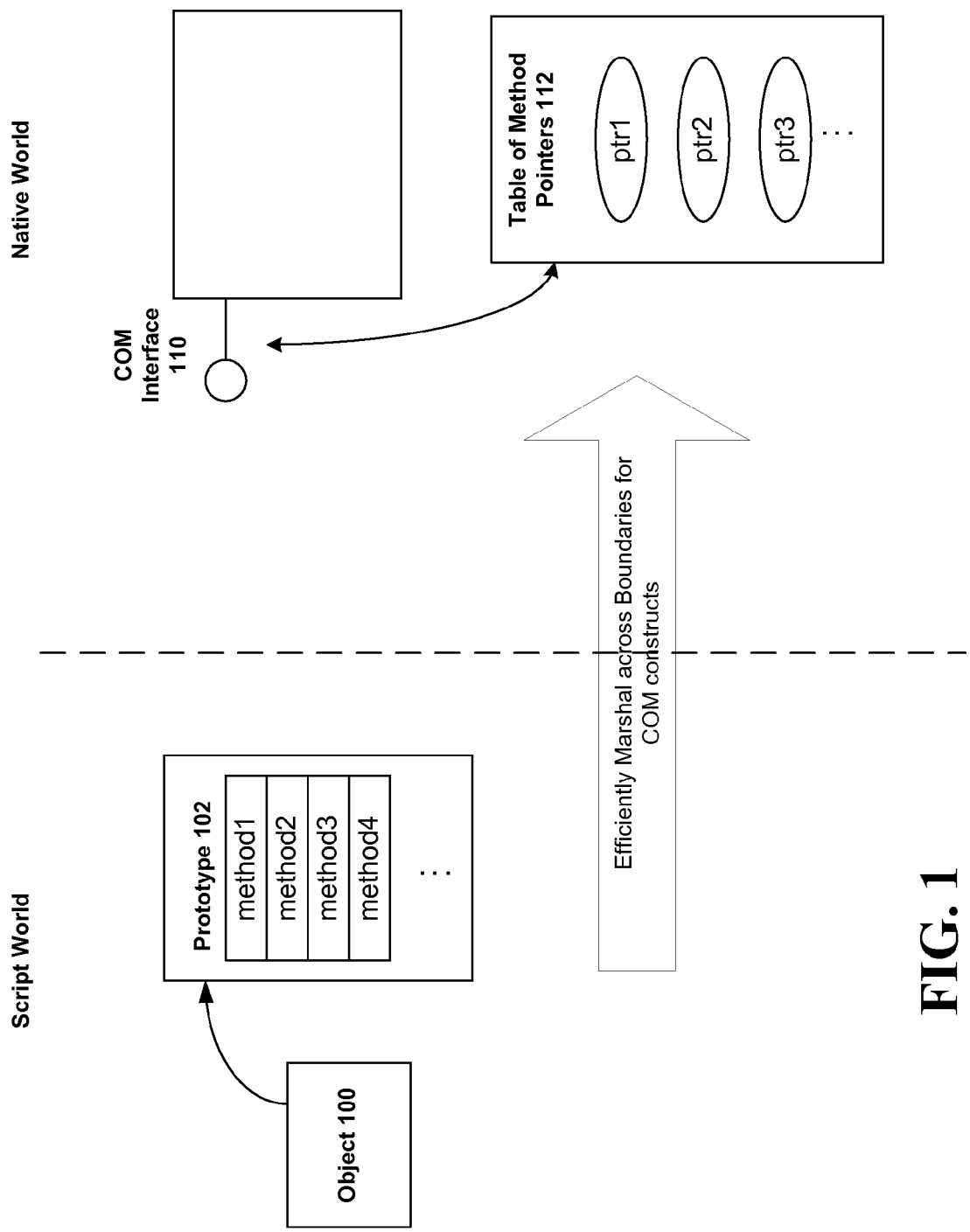
FIG. 1 illustrates an exemplary system that facilitates marshaling of COM constructs across script and native code boundaries according to an embodiment.

As indicated in the background, there have been no web browsing systems designed specifically around efficient code generation for component object model (COM) constructs implicated by marshaling between script and native worlds, or around memory management designed for COM, which continues to be embraced by operating systems, web browsers, etc. For instance, the creation of applications using javascript can be predicated on script acting on COM data constructs.

Dynamic code generation and memory management techniques are provided for COM objects with corresponding representations in script code and native code. A browser component can receive script code including the code representing the COM object and a marshaling component is provided that marshals, based on a request for native code representing the COM object, the code representing the COM object to the native code based on a pre-constructed intermediate data structure. The pre-constructed intermediate data structure, such as a virtual table, is pre-constructed based on a dynamic type representation associated with a prototype of the COM object and cached for re-use by the marshaling component.

Accordingly, in various embodiments, dynamic code generation is provided in consideration of COM and COM constructs. In this regard, dynamic code generation techniques described herein enable fast dynamic marshaling across boundaries between script and native code by waiting to create some COM objects or associated data structures that have been automatically created in the past until some indication is present that the COM objects or data structures will be needed, used or useful, providing up to 150 times speed improvement over the usage of iDispatch COM interfaces in the past. For example, rather than automatically create a virtual table (a.k.a., a "v table") for each COM interface, which is a data structure defining a set or array of virtual functions that are called for a given COM interface, various v tables can be lazily generated by waiting to generate parts of the v table until needed.

In various embodiments, memory management is also redesigned around COM and COM constructs, so that garbage recycling is efficiently performed for COM. Embodiments include the provision memory management including finalizer support of COM objects having script and native world representations including an implementation of a two-phase commit protocol that enables efficient and conservative recycling of objects and associated memory.

In one embodiment, finalizer support is added, for instance, to memory management. Code is generated for script which works really well with COM by going down to the register allocation. Finalizers are applicable where an object is not reachable, is going to die, but the system may want to do some last things to the object before it dies. For instance, where script and native objects exist in relation, e.g., the script object opened a file, a finalizer can be used to close the file before ending the script object. In this regard, data structures are thus provided for recycling of COM to do fast release of references. In one embodiment, two phase commit techniques are employed.

In one embodiment, a method comprises receiving, by a browser application of a computing device, script code including receiving code representing a COM object, generating a prototype of the COM object including generating a type representation including at least one dynamic type associated with the COM object, and, in response to a request for native code representing the COM object, marshaling the code representing the COM object to the native code based on at least one intermediate data construct tailored for dynamic COM object translation between the script code and the native code.

In another embodiment, a computing device, comprising a memory having stored computer executable components and a processor communicatively coupled to the memory that facilitates execution of a browser component and a marshaling component. The browser component is configured to receive script code including code representing a COM object. The marshaling component marshals, based on a request for native code representing the COM object, the code representing the COM object to the native code based on a pre-constructed intermediate data structure of a set intermediate data structures. The pre-constructed intermediate data structure is pre-constructed based on a dynamic type representation associated with a prototype of the COM object and cached for re-use by the marshaling component.

In another embodiment, a computer-readable storage medium is provided comprising computer-readable instructions that, in response to execution by a computing system, cause the computing device including at least one processor to perform operations. The operations include initiating a request to reclaim memory associated with a script code object with a dependency to a component object model (COM) object represented in native code and requesting the script code object and the COM object to prepare for the request to reclaim the memory associated with the script code object. Then, based on confirmation from the script code object that the script code object is prepared for the request and confirmation from the COM object that the COM object is prepared for the request, the dependency can be unwound and the memory associated with the script code object can be reclaimed.

Some performance results have shown that these techniques contribute to a 40-150 times speed improvement over previous web page loads and interactions without application of the various embodiments described herein and in more detail below.

Dynamic Code Generation and Memory Management for Component Object Model Objects FIG. 1 illustrates an exemplary system that facilitates marshaling of COM constructs across script and native code boundaries according to an embodiment. An object 100 from the script universe, e.g., script consumed by a browser application, can instantiate a prototype object 102, which holds methods of the object 100, such as method1, method2, method3, method4, etc. Today, as described above, there is no to efficiently marshal across script and native code boundaries for COM objects by exploiting properties of COM objects in the context marshaling such COM constructs from script to native code, or vice versa. In this regard, if object 100 is a COM object, or if a COM construct is otherwise associated with object 100, reproduction of the COM construct on the native side involves generating of a COM interface 110 associated with a table of method pointers 112, that holds pointers to the native code implementations functionality for various methods of the prototype 102. The number of methods method1, method2, method3, method4, etc. may be of a different order than the set of pointers ptr1, ptr2, ptr3, etc. A slot array can also include slots holding values pertaining to the methods for the COM object. In this regard, today, there is no efficient way to marshal a COM object implementation in script world efficiently to the native code representation, i.e., such marshaling has yet to be considered in a way that is tailored to COM object characteristics, structural aspects or properties.

Figure 2:
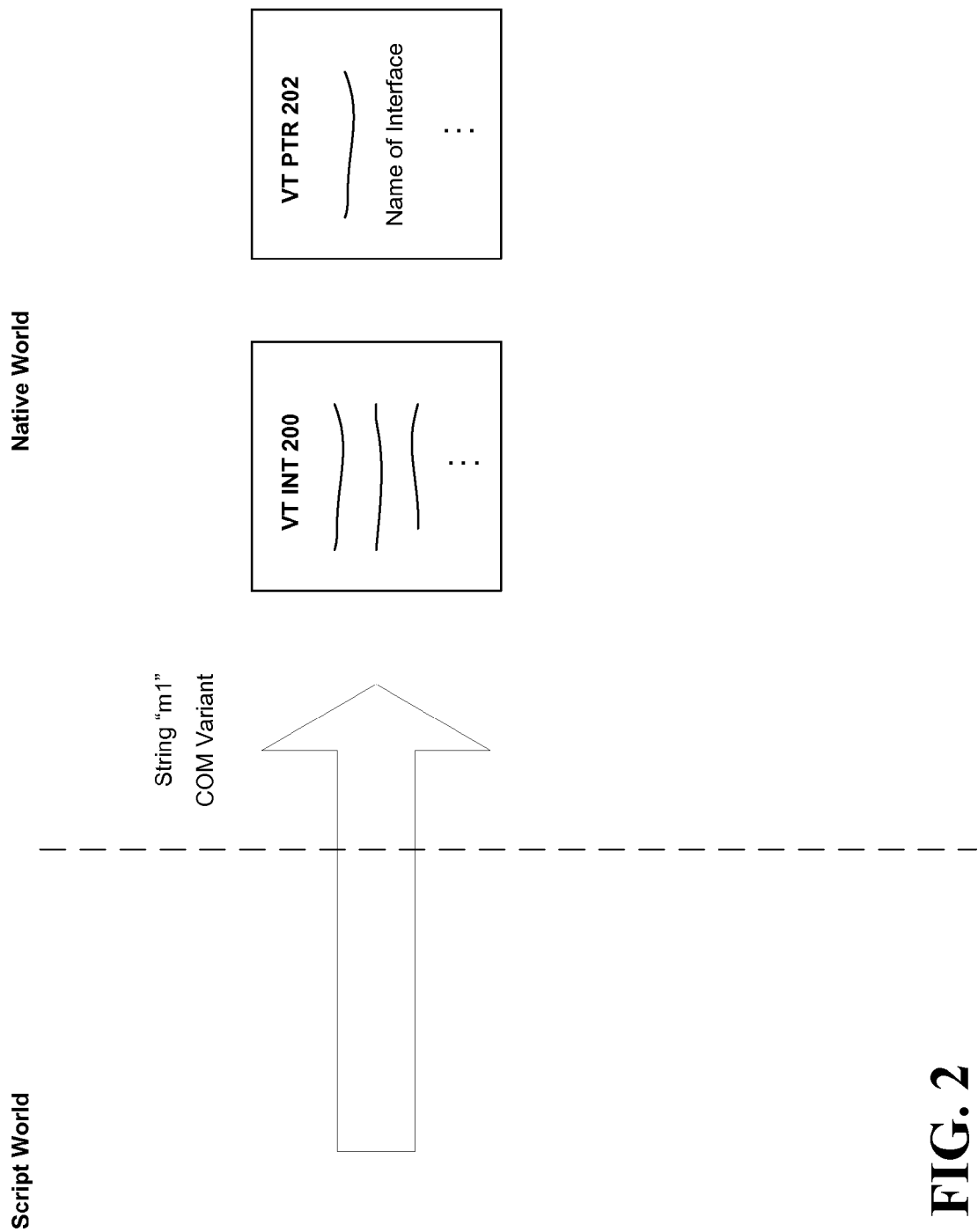
FIG. 2 is a diagram illustrating a process in which expensive data structures are formed in the native code environment based on variables and information passed in a string across the boundary from script to native code according to an embodiment.

FIG. 2 is a diagram illustrating a process in which computationally expensive data structures are formed in the native code environment from the script environment based on variables and information passed in a string across the boundary from script to native code according to an embodiment. In this regard, by packing a string and following a complex communication protocol involving multiple communications across the boundary between script and native execution environments, FIG. 2 in essence illustrates an inefficient way of achieving the marshaling of COM objects from the script world to the native world. In this regard, a complex string of information ml, which varies for different constructs and varies for different COM objects, is packed up to represent information to the native word about representing the underlying objects. For each of the arguments, a COM variant is generated for consumption as string ml, which is a large data structure with all types could possibly want a given method, such as method1 of FIG. 1. Data structures are then generated in native code including a flag indicating a type, such as v table of Integer type 200, with bits of the Integers, or a v table pointer 202, or bits of the pointer, and a name of the interface for the v table pointer (e.g., a dispatch ID number). In this regard, creating the logic, the strings, and the data structures is computationally expensive, as also is creating the logic from strings to numbers to methods in native code representing COM objects and corresponding methods.

As mentioned, to perform this string based marshaling, a complex protocol is also currently followed involving a variety of back and forth communications, such as to request a particular dispatch ID, replies, such as asking how many arguments are desired, answers, such as a number of desired arguments, further replies, such as "only a subset of the desired arguments are available", further questions, such as "should a default solution be applied when fewer arguments are available than desired?", further answers, and so on. The current protocol is unwieldy when it comes to the needs of COM objects and thus, techniques are provided herein that streamline the generation of COM objects in the native world advantageous, as described in more detail below.

Figure 3:
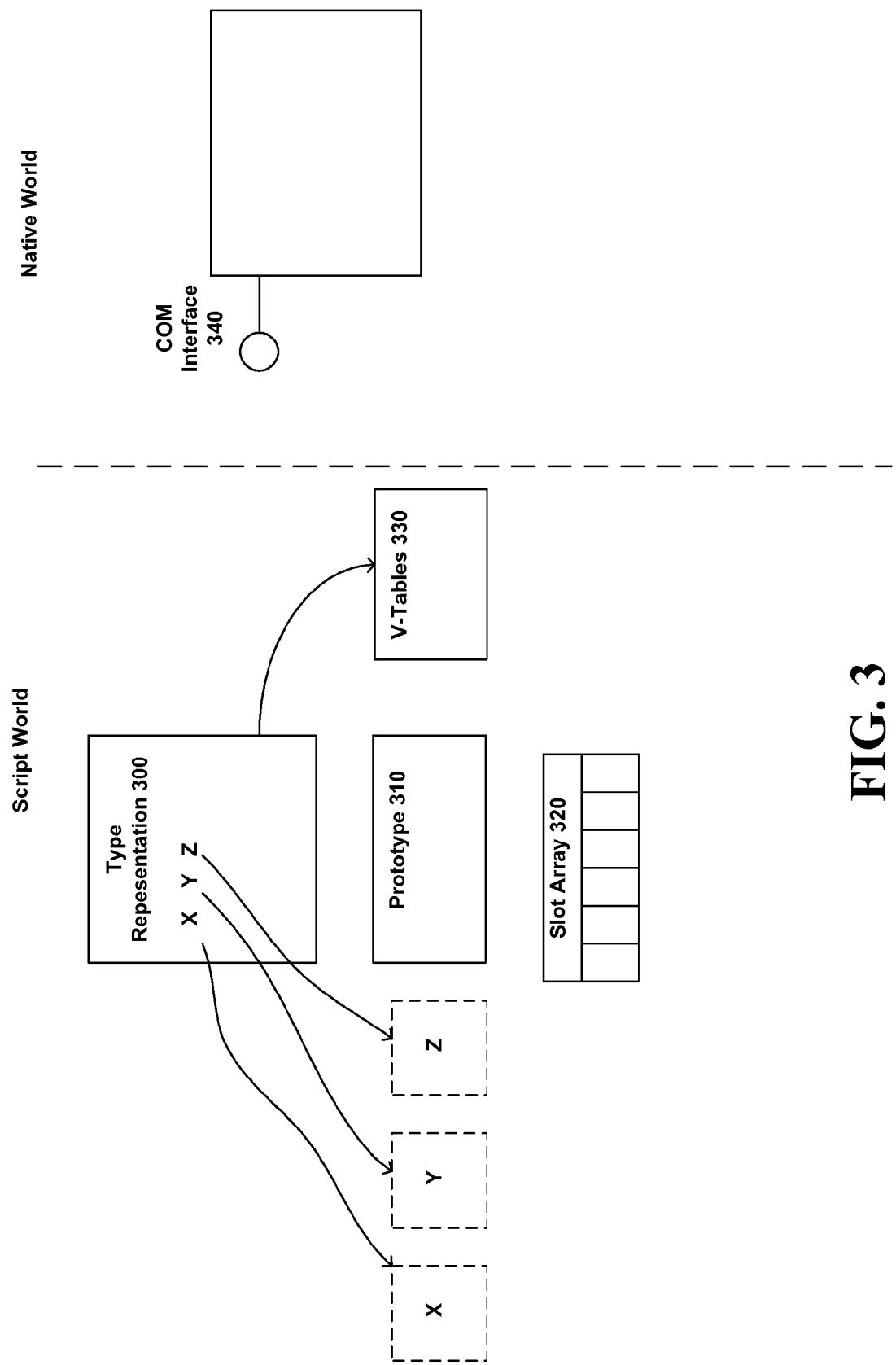
FIG. 3 is a diagram illustrating a process that forms data structures based on script objects including representations of COM objects for efficient use and/or re-use during a marshaling process according to an embodiment.

FIG. 3 is a diagram illustrating a process that forms data structures based on script objects including representations of COM objects for efficient use and/or re-use during a marshaling process according to an embodiment. In this embodiment, a custom set of intermediate data structures, such as a sequence of codes, is generated for COM objects on the script side, and these script side representations include values of the COM code and enable calling the COM interface 340 directly.

For instance, in the non-limiting context of generating v tables, in one embodiment, a v table is generated as an intermediate data structure once for each dynamic type representation represented by type representation 300. For instance, type representation 300 represents types of sub-objects X, Y and Z of prototype 310 of a COM object. At run time, the type representation 300 can be created. In this example, the type representation 300 has an X, Y, Z, but another one might have X, A, Z and W, and thus, based on a run time analysis of dynamic type representations, such as dynamic type representation 300, over time, other COM objects that will run can leverage the preparatory work and data structures performed in connection with the running of other instances of COM objects. Accordingly, with the presently described embodiments, there is an opportunity to perform some work in the background, prior to any need for a COM object representation in the native environment, to build intermediate data structures that take advantage of COM attributes, characteristics or properties, so that the marshaling of COM objects from script to native code is made efficient.

As mentioned, one way to facilitate the marshaling process is to build intermediate data structures tailored to the generation of v tables associated with the methods and types of prototype 310. Prototype 310 can have a slot array 320 because dynamic objects have different dynamic properties, different and separated from the object header, which are represented in the slot array, which is a data structure representing where all the values are stored, type, how many slots, how many types, etc. In this regard, the dynamic type of the dynamic type representation 300 can be used to drive generation of the COM interaction and object marshaling. The intermediate data structures, such as v-tables 330 that point to code portions for each method and generated based on the dynamic type representation 300, can be cached and then be re-used for further marshaling, since their parts may be shared, and composed as needed, by and among many COM objects to be made sooner or later.

Various embodiments thus take advantage of dynamic type representations, and by applying advance knowledge of how COM data structures are represented, marshaling the COM data structures across script/native boundaries is performed faster by re-using the cached v-tables 330 rather than dynamic synthesizing them when needed. V-tables are thus institutionalized into the dynamic type representation in one aspect. For common cases of COM objects, since the intermediate data structures will have already been created, the system does not allocate a new v-table, but rather can quickly compose or group the intermediate data structures from fast in-memory storage to suit the given COM object.

Accordingly, by introducing specialized knowledge of COM into the marshaling process, such as by re-using v-table intermediate data structures, and being able to synthesize a v-table fast, thus improves the browsing experience or other experience traversing script and native code boundaries for COM objects. Once many instances of the intermediate data structures are formed and cached, marshaling has in effect already been done. Even where a new dynamic type is introduced by a given COM object without a v table, the system is also fast at creating the new v table intermediate data structure due to specialized COM knowledge of the type system. In this regard, knowledge of what COM interfaces the script engine knows about informs the process. As methods are being added to an object, the methods can be incrementally matched to the COM interfaces about which the script engine already knows, and knowledge is maintained of what objects can implement what COM interfaces. With this knowledge, with a mere check of a given type of COM structure, a determination of whether the cached structures can be re-used or whether any should be synthesized from scratch is possible.

The creation and maintenance of the intermediate data structures to support the marshaling of COM objects can be background activity and thus can create performance benefits with low costs, e.g., the creation and caching of v tables for reuse, any incremental bookkeeping can be performed in the background, identifying what objects correspond to interfaces, and enable fast synthesis as a result.

Figure 4:
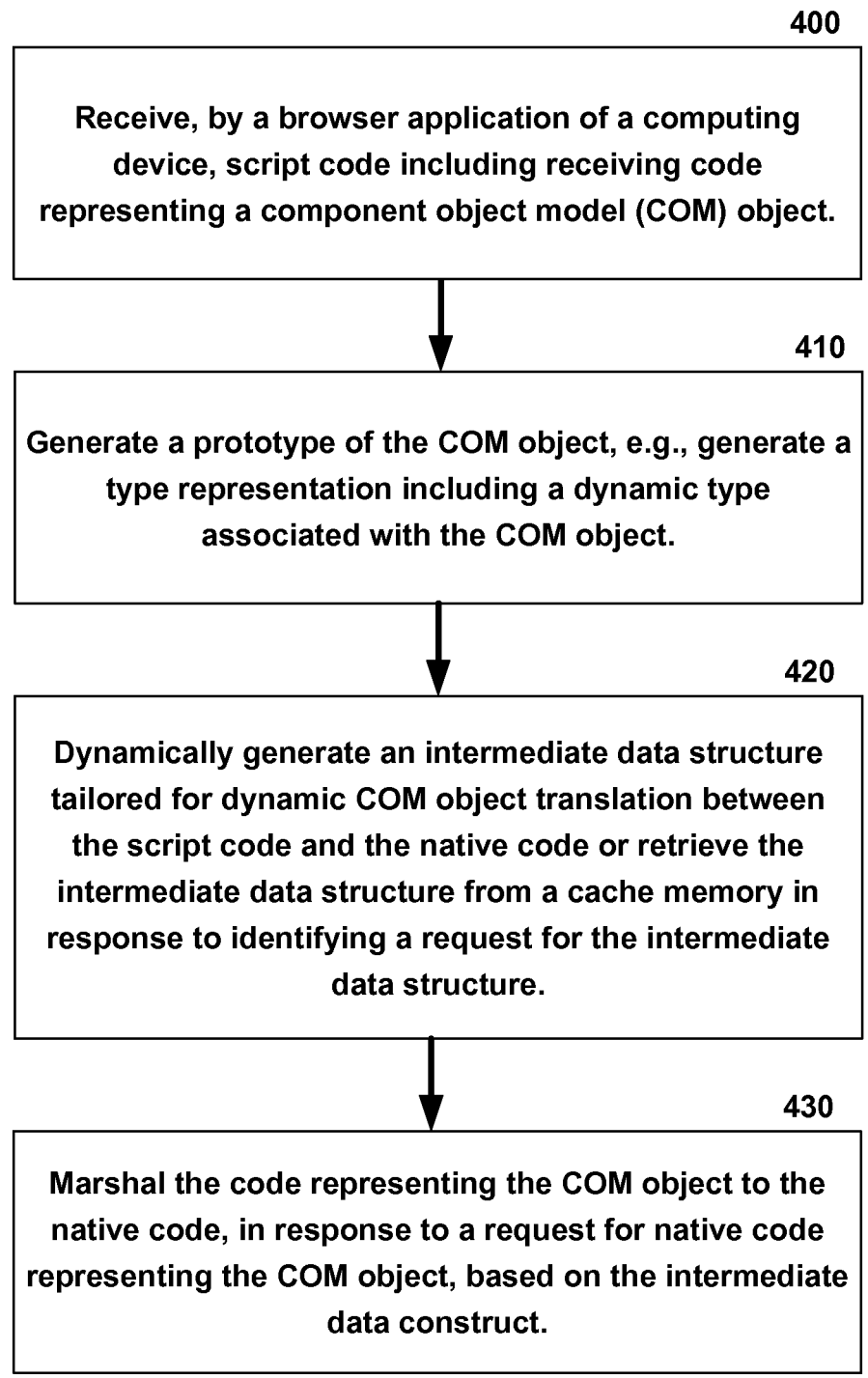
FIG. 4 is a flow diagram illustrating an exemplary non-limiting embodiment for dynamically marshaling based on intermediate data structures tailored to COM representations according to an embodiment.

FIG. 4 is a flow diagram illustrating an exemplary non-limiting embodiment for dynamically marshaling based on intermediate data structures tailored to COM representations according to an embodiment. At 400, script code including a representation of a COM object is received by a browser application of a computing device. At 410, a prototype of the COM object is generated, e.g., a type representation including a dynamic type associated with the COM object is generated. At 420, in response to identifying a request for an intermediate data structure tailored for dynamic COM object translation between the script code and the native code, the intermediate data structure can be generated or the intermediate data structure can be retrieved from a cache memory. At 430, the code representing the COM object is marshaled to the native code, in response to a request for native code representing the COM object, based on the intermediate data construct.

The intermediate data structure can be dynamically generated for handling the marshaling in response to the request for the native code. The intermediate data structure can be accessed from a pre-stored set of intermediate data structures previously generated based on the script code.

An example of an intermediate data structure is a virtual table based on a type of a dynamic type, which can be cached for re-use. A determination can be made that a virtual table for a given type of the dynamic type is not pre-stored and if so, the virtual table can be dynamically generated for handling the marshaling. A determination can be made that a virtual table for a given type of the dynamic type is pre-stored and if so, the virtual table can be accessed for handling the marshaling.

Figure 5:
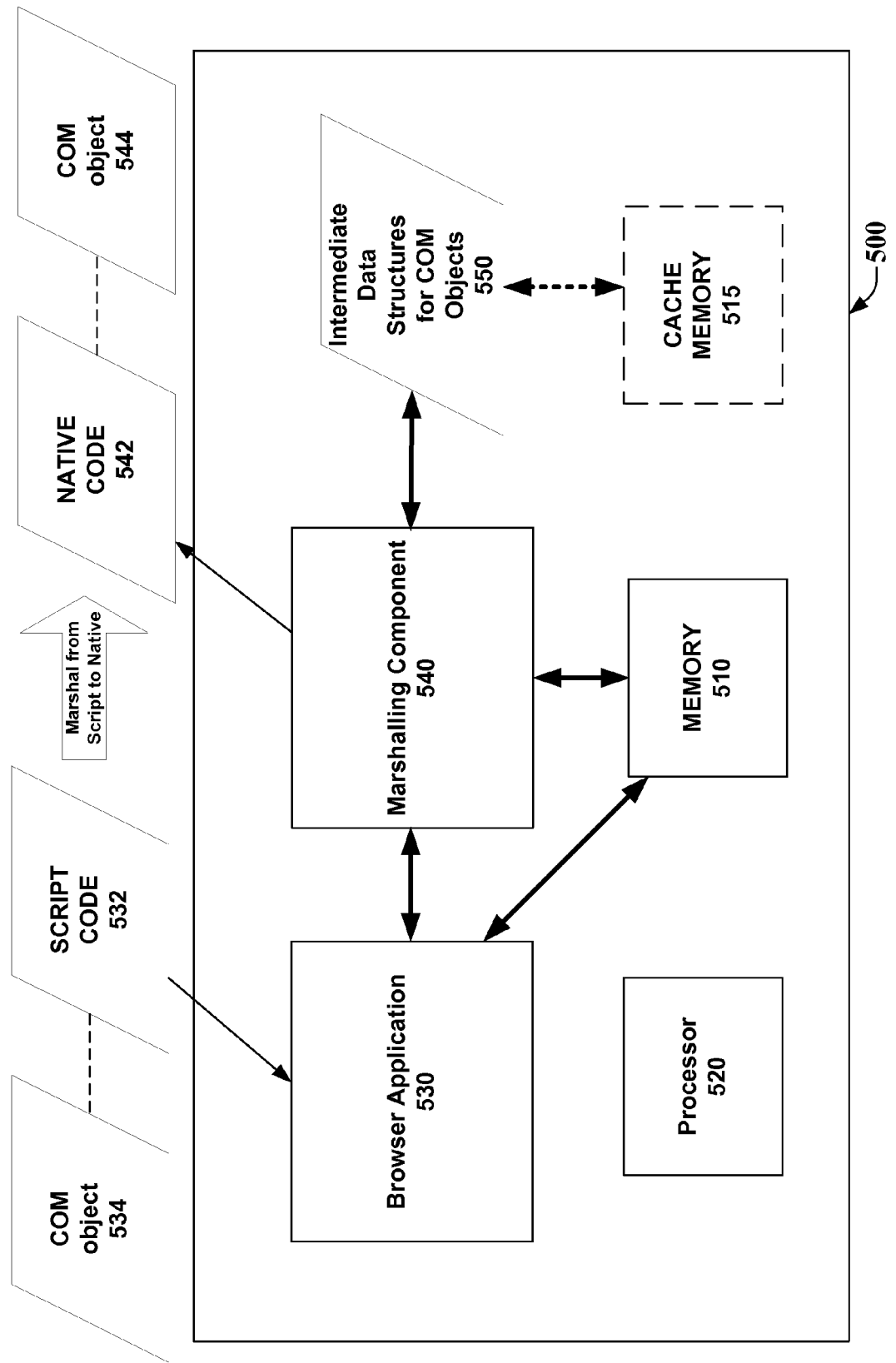
FIG. 5 is a block diagram illustrating an exemplary computing device comprising dynamic marshaling capabilities based on intermediate data structures tailored to COM representations according to an embodiment.

FIG. 5 is a block diagram illustrating an exemplary computing device comprising dynamic marshaling capabilities based on intermediate data structures tailored to COM representations according to an embodiment. A non-limiting computing device 500 can include memory 510 for storing computer-executable components and instructions. A processor 520 can facilitate operation of the computer-executable components and instructions by the computing device 500. In this regard, in one embodiment, computing device 500 includes browser application 530 that receives script code 532 which can include COM object 534, which will be marshaled to native code 542 and corresponding COM object 544 in native representation. A marshaling component 540 cooperates with browser application 530, or is included with browser application 530, which generates intermediate data structures for COM objects 550, which can be stored in a cache memory 515, which can be included in, or separate from memory 510.

The computing device 500 can include memory 510 having computer executable components stored thereon and a processor 520 communicatively coupled to the memory 510, the processor 520 configured to facilitate execution of a browser component 530 configured to receive script code 532 including code 534 representing a component object model (COM) object and a marshaling component 540 configured to marshal, based on a request for native code 542 including COM object 544 representing the COM object. Applying the techniques described herein, the COM object 544 representing the COM object to the native code 542 is based on a pre-constructed intermediate data structure of a set intermediate data structures, which is pre-constructed based on a dynamic type representation associated with a prototype of the COM object and cached for re-use by the marshaling component.

The marshaling component 530 is further configured to dynamically generate another intermediate data structure based on a request for the other intermediate data structure when the other intermediate data structure is not cached for re-use. The marshaling component 530 is further configured to cache the other intermediate data structure for further re-use.

The marshaling component 530 is further configured to generate a virtual table based on a type of the at least one dynamic type and cache the virtual table for re-use. The marshaling component 530 is further configured to determine that a virtual table for a given type of the dynamic type is not pre-stored and dynamically generate the virtual table if not pre-stored. The marshaling component 530 is further configured to determine that a virtual table for a given type of the dynamic type is pre-stored and access the virtual table, if so.

In addition to the creation and maintenance of data structures that enable efficient marshaling of COM objects across script/native code boundaries, various embodiments described in more detail below provide efficient memory management in consideration of COM data structures including efficient garbage collection and cleanup of COM data structures, including finalizer support suited to COM data structures.

Figure 6:
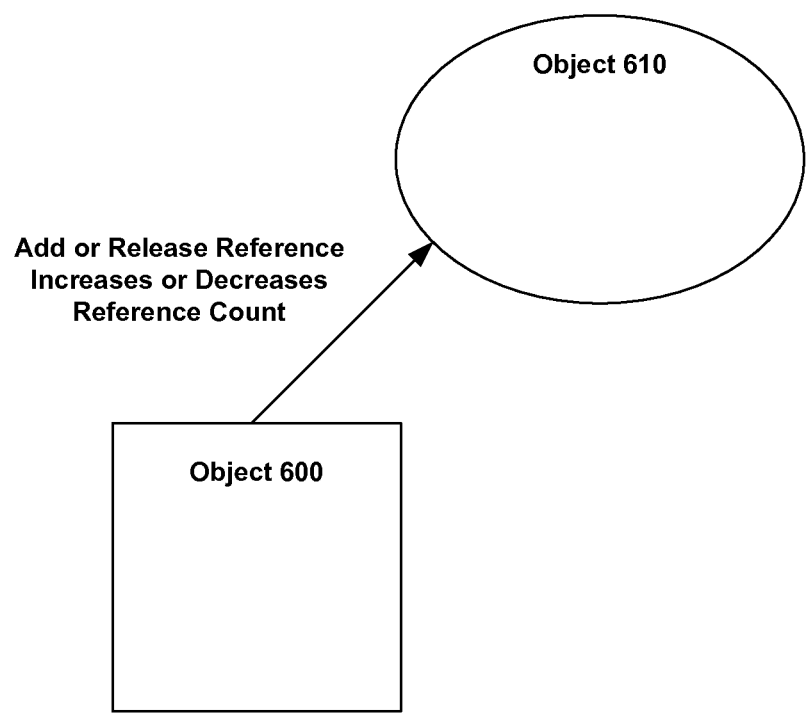
FIG. 6 is a diagram illustrating exemplary reference counting for COM objects according to an embodiment.

In this regard, in one embodiment a garbage collection process is given knowledge of the memory management requirements of COM objects. In particular, COM has a problem with circular references, since reference counting is used. FIG. 6 is a diagram illustrating exemplary reference counting for COM objects according to an embodiment. In COM, whenever an object 610 receives a pointer from an object 600, object 610 increments a counter by 1 to reflect the addition of the reference. In turn, when the object 600 ceases to hold its pointer to object 610, the counter is decremented by 1. When the counter reaches zero, object 610 can be deleted.

Figure 7:
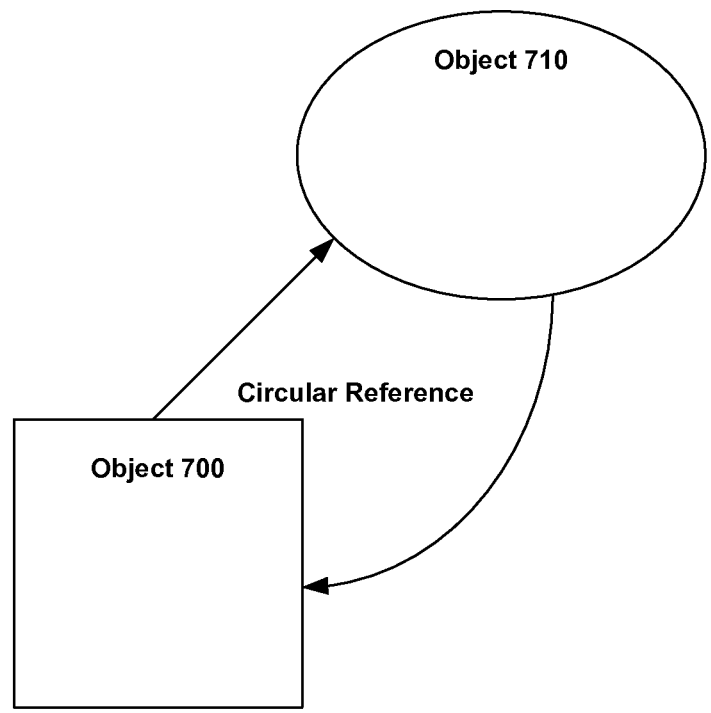
FIG. 7 is a diagram illustrating exemplary reference counting for a variety of COM objects resulting in a circular reference situation addressed by an embodiment described herein.

The work to implement this is incremental, but the bookkeeping is hard due to the cost of an error. If done wrong, references stay held when not needed or vice versa. This can happen, for example, when the bookkeeping work starts in one domain, but then other domains become involved in holding or releasing references to object 610, and due to hidden rules about when or how the counter can be changed, etc., rules can become quagmire or lost in the solution. And such an error can ultimately result in a circular referencing situation, which in its simplest form, is represented in FIG. 7, where object 700 holds a reference to object 710, but deletion of either object cannot proceed, because of the reciprocal dependency of object 710 holding a reference to object 700, even where either object serves no present purpose in the system, and could be deleted.

Figure 8:
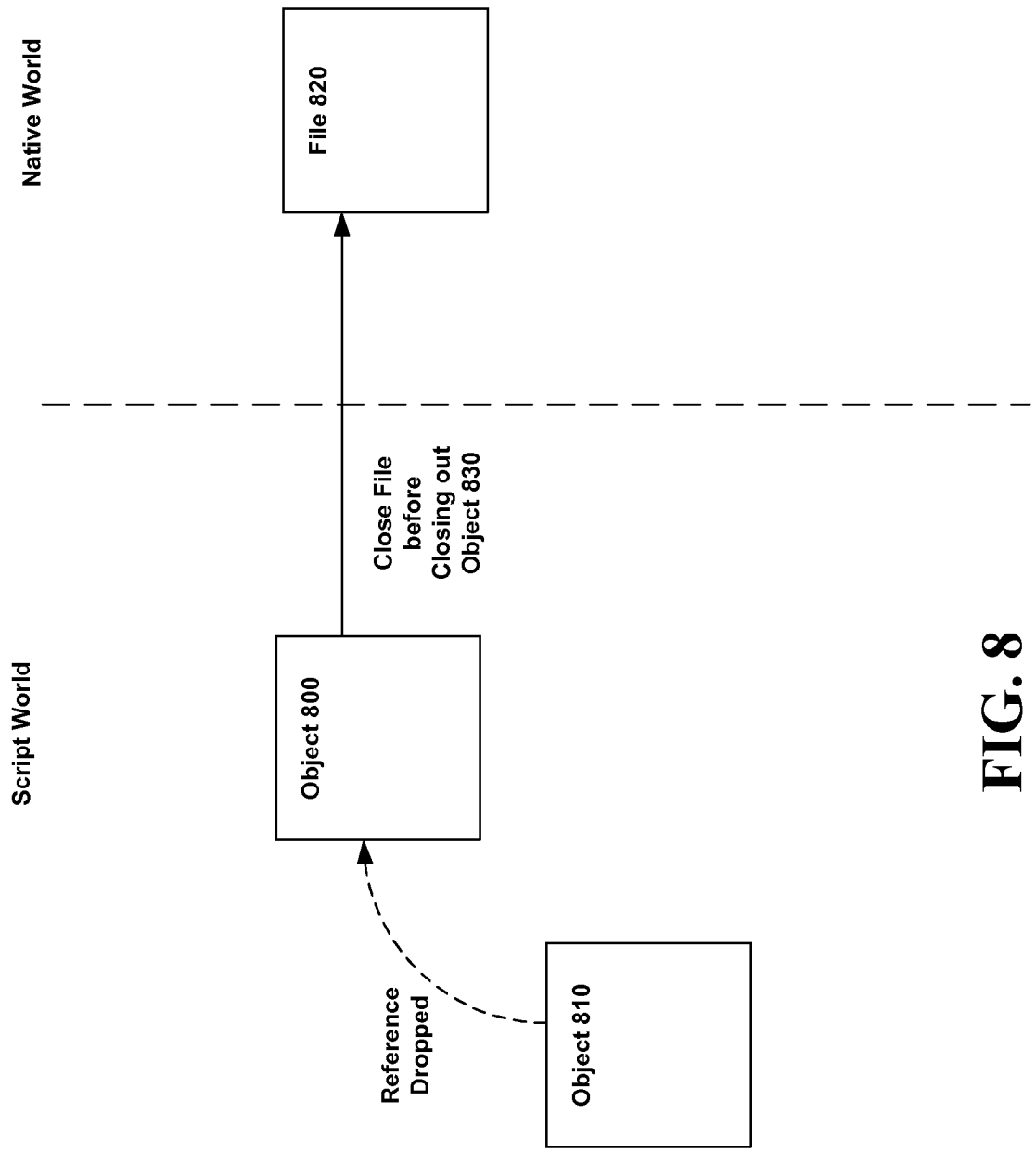
FIG. 8 is a block diagram illustrating an exemplary memory management function with finalizer support for objects referenced in native code from script code according to an embodiment.

Accordingly, embodiments herein substantially reduce the probability or number of circular references that occur by providing finalizer support suited for COM object finalization. FIG. 8 illustrates example finalizer support for objects referenced in native code from script code according to an embodiment. For example, if an instance of an object 800 is pointed to or referenced by an object 810, it may be desirable to close delete or reclaim memory associated with the object 800 when that references is dropped by object 810. However, the memory management system of the script engine may take the opportunity to determine if there are any last functions to perform with respect to object 800, e.g., to unwind any dependencies of object 800. An example of a dependency of object 800 would be if object 800 has opened a file 820 in native code during execution, and thus, for efficient operating system performance of the native environment, the file 820 is closed prior to reclaiming memory associated with object 800. The object 800 is thus finalized after the reference from object 810 is dropped to maintain efficient state of affected objects and dependencies. Finalization also gives objects, such as object 800, a chance to assess whether any dependency prevents reclamation of their memory, as their use to the system may remain for other reasons to be discovered through an analysis of dependencies.

Figure 9:
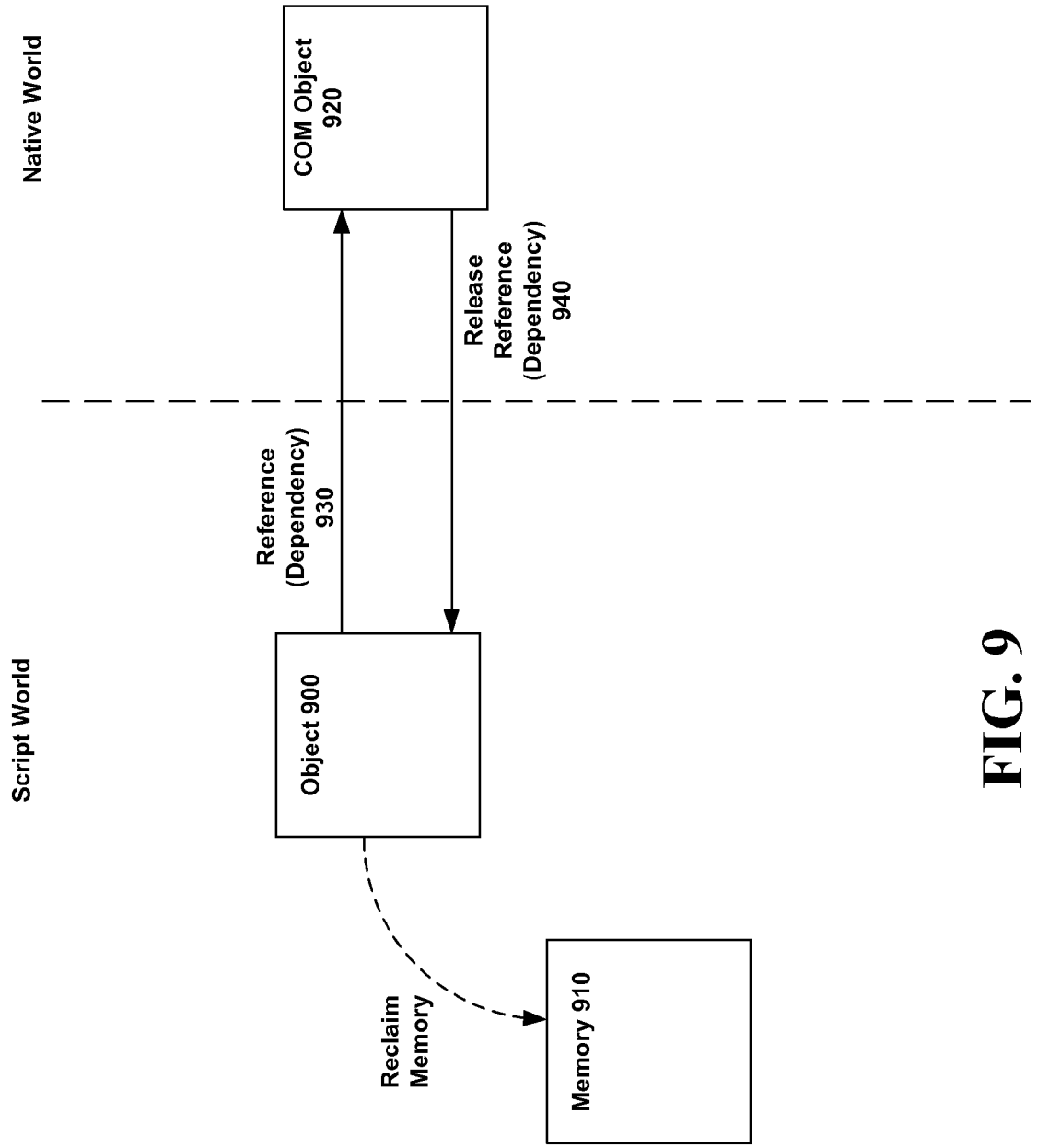
FIG. 9 is a block diagram illustrating an exemplary memory management function with finalizer support for COM objects referenced in native code from script code according to an embodiment.

FIG. 9 is a block diagram illustrating an exemplary memory management function with finalizer support for COM objects referenced in native code from script code according to an embodiment. As mentioned, a finalizer is used for an object that is of no further use to a system, and is not reachable by any object, but there may be some final operations to perform with respect to the object, e.g., to unwind a dependency.

In the native code versus script code context, script object 900 may be occupying some memory 910, and script object 900 may invariably acquire references 930 to other objects such as a COM object 920 represented in native code, or release references 940 of the references 930 depending on the operation. Embodiments herein thus provide recycling for COM including data structures and methods for fast release. In this regard, for example, script object 900 might hold some native resource, like a file or a reference to COM object 920. The script object 900 represents the object to the script world, and over time, the system may no longer need the object and wish to consume the memory for other usages, but before script object 900 can be removed, the COM object 920 is checked to determine that the dependency can be removed.

If script object 900 points at COM object 920, it will have added a reference 930. Then, if the system wants to reclaim the memory associated with script object 900, before the system decrements the counter associated with the dependency to COM object 920, a release is to be performed, and thus a finalizer runs code to handle the release. In one aspect, the speed of releasing a COM object as part of finalizing is increased in the embodiments described herein by implementing interoperation of functionality with COM referencing and through a two-phase commit protocol that ensures no objects are prematurely finalized.

By way of a little background concerning two-phase commit, the protocol is commonly used in transaction processing, databases, and computer networking and is a type of atomic commitment protocol. Two-phase commit is a distributed algorithm that coordinates processes that participate in a distributed atomic transaction on whether to commit or abort (roll back) the transaction (a type of consensus protocol). To accommodate recovery from failure, the protocol's participants use logging of the protocol's states. Log records, which are typically slow to generate but survive failures, are used by the protocol's recovery procedures. Protocol variants exist that primarily differ in logging strategies and recovery mechanisms. In a "normal execution" of any single distributed transaction, i.e., when no failure occurs, which is typically the most frequent situation, the protocol comprises two phases:

The commit-request phase, or voting phase, in which a coordinator process attempts to prepare all the transaction's participating processes to take the steps for either committing or aborting the transaction and to vote, either "Yes": commit if the transaction participant's local portion execution has no issues, or "No": abort if a problem has been detected with the local portion, and The commit phase, in which, based on the voting, the coordinator decides whether to commit (if unanimously have voted "Yes") or abort the transaction (otherwise), and notifies the result to the transaction participants. The participants can then follow with actions (commit or abort) with their local transactional resources.

While developed in transaction processing, the two-phase commit protocol used in this context allows fast and accurate release of COM data constructs for efficient memory management. In this regard, the two-phase commit protocol is generalizable to any exchange involving uncertainty of actors, whereby each participant to a transaction is asked to prepare to commit, and if the participant is prepared, the participant indicates readiness, and if the participant indicates a lack of readiness, the participant indicates non-readiness. If the participants are prepared then they are committed by preparing for the transaction and guaranteeing the transaction can move forward.

For instance, in the context of a release of a dependency or reference to a COM object 920 represented in native code, before memory 910 can be reclaimed, script object 900 releases its dependency on COM object 920, but follows a two-phase commit communication in which a finalizer is applied to script object 900 and COM object 920 to ask if ready for release 940. If so, after confirming ready to commit, the release 940 can proceed, however, if script object 900 or COM object 920 is not ready to commit, the release 940 does not move forward. The prepare and commit steps are logged in order to allow for proper recovery of state and reference counts held by the system. In various embodiments, the finalizer support for COM objects is embodied in a garbage collector that uses data structures to speed up COM memory reclamation. In one embodiment, when the finalizer is called, the finalizer can hold pointers to objects on its stack, and does not reclaim the memory to the objects where the stack is being scanned.

When a COM object is thus unreachable, a finalizer is invoked that implements a two-phase commit process. As an example, a script object have a dependency to a native object, e.g., a native object such as a piece of a document represented as a node in the document object model tree. The script object obtains the reference, but once the native object is not reachable by the script engine, the finalizer can call back to the native code to let it know to decrement its reference count as part of finalization, which helps improve reference counting across domains.

In this regard, with respect to application of the two-phase commit protocol, when a host side is asked to prepare to commit, the host side may not be ready to respond, in which case the hose side can respond by asking not to proceed with the transaction. For example, the host may have been given a proxy so that the proxy represents that object, and so deletion may not yet proceed.

When the participants are asked to "prepare", the question may be whether some memory can be reclaimed, or not. When a participant commits, the transaction, such as reclamation of memory can proceed. If a participant cannot commit, then, in this context, optionally, the host may ping the script engine to determine readiness to delete. Another option two-phase commit allows is that the host can clean up resources associated with an object. That object might point at stuff in the host, like an open file, and the host can try to close the file, and if it can, states "go ahead and prepare," otherwise states to "wait" until it can.

Two-phase commit in this context helps to resolve circular references by introducing finalizer support for COM objects in a robust manner. Reference counting alone doesn't handle the resolution of circular references, whereas two-phase commit prevents circular references from forming due to an inability of a part of a system to deliver on a piece of a transaction. In this regard, one side or the other, host or native, can unilaterally break the transaction from proceeding. For instance, the script side can say that the transaction will break, and the native side can then make a choice as to either accept that, or responsibility can be taken for breaking the transaction. Two-phase commit protocol variants support a broad class of techniques of one or the other side breaking the circle, and handling the consequences.

Figure 10:
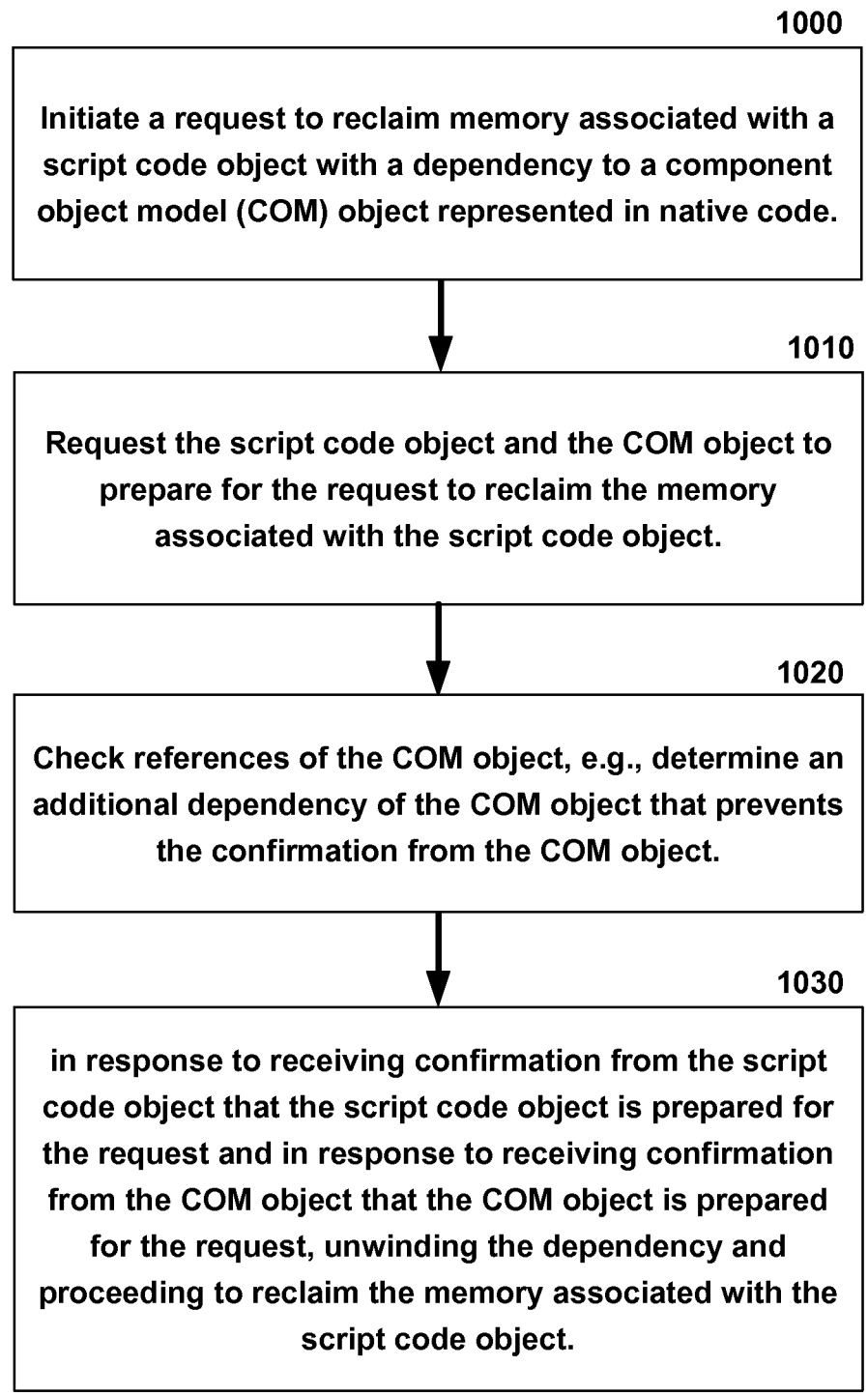
FIG. 10 is a flow diagram illustrating an exemplary non-limiting embodiment for applying a two phase commit process in connection with the finalizer support provided for COM objects according to an embodiment.

FIG. 10 is a flow diagram illustrating an exemplary non-limiting embodiment for applying a two phase commit process in connection with the finalizer support provided for COM objects according to an embodiment. At 1000, a request is initiated to reclaim memory associated with a script code object with a dependency to a component object model (COM) object represented in native code. At 1010, the script code object and the COM object are requested to prepare for the request to reclaim the memory associated with the script code object. At 1020, references of the COM object are checked, e.g., determine an additional dependency of the COM object that prevents the confirmation from the COM object. Based on whether confirmation from the script code object that the script code object is prepared for the request and whether confirmation from the COM object that the COM object is prepared for the request, the dependency can be unwound and the memory associated with the script code object can be reclaimed.

In one embodiment, the unwinding and the proceeding adhere to a two-phase commit protocol with the requesting corresponding to a prepare phase, and the unwinding and proceeding corresponding to a commit phase. The initiating the request can be to reclaim memory associated with the script code object having a pointer to the COM object. The unwinding of the dependency can include releasing the COM object or decrementing a reference count associated with the COM object.

The checking of references of the COM object can include determining an additional dependency of the COM object that prevents the confirmation from the COM object.

Exemplary Networked and Distributed Environments

One of ordinary skill in the art can appreciate that the various embodiments for dynamic code generation and memory management for COM objects described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the mechanisms for dynamic code generation and memory management for COM objects as described for various embodiments of the subject disclosure.

Figure 11:
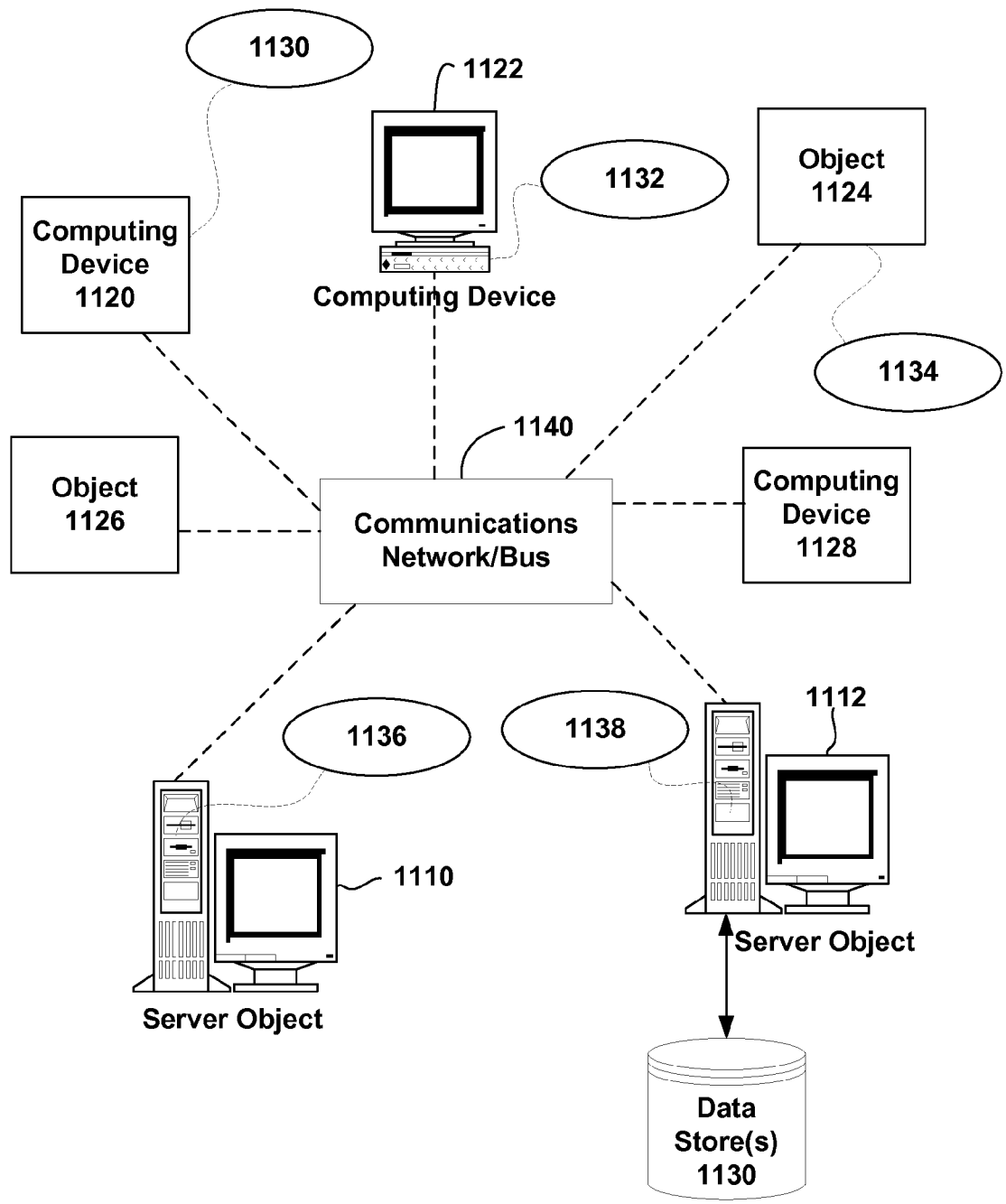
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques for dynamic code generation and memory management for COM objects provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for dynamic code generation and memory management for COM objects as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Exemplary Computing Device

As mentioned, advantageously, the techniques described herein can be applied to any device where it is desirable to perform dynamic code generation and memory management for COM objects in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 12:
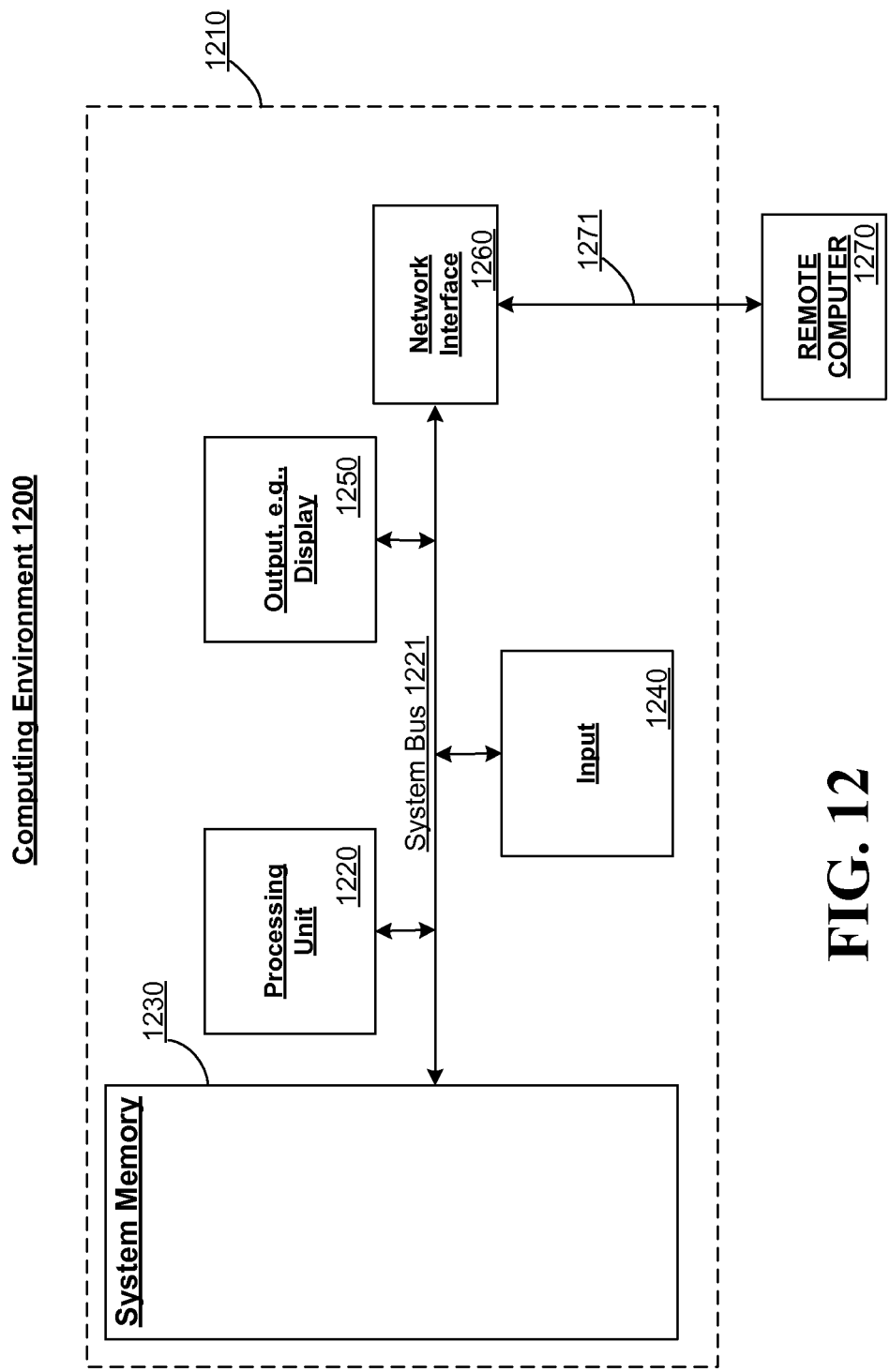
FIG. 12 is a block diagram representing an exemplary non-limiting computing system or operating environment in which one or more aspects of various embodiments described herein can be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither should the computing system environment 1200 be interpreted as having any dependency or requirement relating to any one or combination of components illustrated in the exemplary computing system environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data. According to a further example, computer 1210 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections, such as network interfaces 1260, to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method, comprising:
   receiving, by a browser application of a computing device, script code including receiving code representing a component object model (COM) object;
   generating a prototype of the COM object including generating a type representation including at least one dynamic type associated with the COM object;
   by a marshaling component of the computing device, prior to a request for native code representing the COM object, in response to identifying a request for at least one intermediate data structure, dynamically generate the at least one intermediate data structure tailored for dynamic COM object translation between the script code and the native code, the at least one intermediate data structure generated based on the at least one dynamic type associated with the prototype of the COM object; and in response to the request for native code representing the COM object, marshaling, by the marshaling component of the computing device, the code representing the COM object to the native code based on the at least one intermediate data construct.

2. The method of claim 1, further comprising:
by the marshaling component of the computing device, retrieving the at least one intermediate data structure from a cache memory in response to identifying the request for the at least one intermediate data structure.

3. The method of claim 1, further comprising:
by the marshaling component of the computing device, accessing the at least one intermediate data structure from a pre-stored set of intermediate data structures previously generated based on the script code.

4. The method of claim 1, further comprising:
generating a virtual table based on a type of the at least one dynamic type; and
caching the virtual table generated for the type for re-use.

5. The method of claim 1, further comprising:
determining that a virtual table for a given type of the at least one dynamic type is not pre-stored; and
dynamically generating the virtual table for handling the marshaling in response to the determining that the virtual table is not pre-stored.

6. The method of claim 1, further comprising:
determining that a virtual table for a given type of the at least one dynamic type is pre-stored; and
accessing the virtual table for handling the marshaling in response to the determining that the virtual table is pre-stored.

7. A computing device, comprising:
a memory having computer executable components stored thereon; and
a processor communicatively coupled to the memory, the processor configured to facilitate execution of the computer executable components, the computer executable components comprising:
a browser component configured to receive script code including code representing a component object model (COM) object; and
a marshaling component configured to, prior to a request for native code representing the COM object, in response to identifying a request for a pre-constructed intermediate data structure, dynamically generate the pre-constructed intermediate data structure tailored for dynamic COM object translation between the script code and the native code, the pre-constructed intermediate data structure generated based on a dynamic type associated with a prototype of the COM object, the marshaling component further configured to marshal, based on the request for native code representing the COM object, the code representing the COM object to the native code based on the pre-constructed intermediate data structure of a set intermediate data structures, the pre-constructed intermediate data structure cached for re-use by the marshaling component.

8. The computing device of claim 7, wherein the marshaling component is further configured to dynamically generate at least one other intermediate data structure of the set of intermediate data structures based on a request for the at least one other intermediate data structure in response to the at least one other intermediate data structure not being cached for re-use.

9. The computing device of claim 8, wherein the marshaling component is further configured to cache the at least one other intermediate data structure for further re-use.

10. The computing device of claim 8, wherein the marshaling component is further configured to generate a virtual table based on a type of the at least one dynamic type and cache the virtual table for re-use.

11. The computing device of claim 8 wherein the marshaling component is further configured to determine that a virtual table for a given type of the at least one dynamic type is not pre-stored and dynamically generate the virtual table in response to a determination that the virtual table is not pre-stored.

12. The computing device of claim 8, wherein the marshaling component is further configured to determine that a virtual table for a given type of the at least one dynamic type is pre-stored and access the virtual table in response to a determination that the virtual table is pre-stored.

13. A computer-readable storage memory comprising computer-readable instructions that, in response to execution by a computing system, cause the computing device including at least one processor to perform operations, comprising:
receive, by a browser application of a computing device, script code including receiving code representing a component object model (COM) object;
generate a prototype of the COM object including generating a type representation including at least one dynamic type associated with the COM object;
by a marshaling component of the computing device, prior to a request for native code representing the COM object, in response to identifying a request for at least one intermediate data structure, dynamically generate the at least one intermediate data structure tailored for dynamic COM object translation between the script code and the native code, the at least one intermediate data structure generated based on the at least one dynamic type associated with the prototype of the COM object; and
in response to a request for native code representing the COM object, marshal, by the marshaling component of the computing device, the code representing the COM object to the native code based on the at least one intermediate data construct.

14. The computer-readable storage memory of claim 13, further comprising:
by the marshaling component of the computing device, access the at least one intermediate data structure from a pre-stored set of intermediate data structures previously generated based on the script code.

15. The computer-readable storage memory of claim 13, further comprising:
generate a virtual table based on a type of the at least one dynamic type; and
cache the virtual table generated for the type for re-use.

16. The computer-readable storage memory of claim 13, further comprising:
determine that a virtual table for a given type of the at least one dynamic type is not pre-stored; and
dynamically generate the virtual table for handling the marshaling in response to the determining that the virtual table is not pre-stored.

17. The computer-readable storage memory of claim 13, further comprising:
determine that a virtual table for a given type of the at least one dynamic type is pre-stored; and
access the virtual table for handling the marshaling in response to the determining that the virtual table is pre-stored.

* * * * *